(12) United States Patent
Coban et al.

(10) Patent No.: US 11,330,272 B2
(45) Date of Patent: May 10, 2022

(54) USING A MOST PROBABLE SCANNING ORDER TO EFFICIENTLY CODE SCANNING ORDER INFORMATION FOR A VIDEO BLOCK IN VIDEO CODING

(71) Applicant: QUALCOMM Incorporated, San Diego, CA (US)

(72) Inventors: Muhammed Zeyd Coban, Carlsbad, CA (US); Yunfei Zheng, San Jose, CA (US); Joel Sole Rojals, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/693,451

(22) Filed: Nov. 25, 2019

(65) Prior Publication Data
US 2020/0099934 A1 Mar. 26, 2020

Related U.S. Application Data

(63) Continuation of application No. 13/332,054, filed on Dec. 20, 2011, now abandoned.
(Continued)

(51) Int. Cl.
*H04N 19/129* (2014.01)
*H04N 19/157* (2014.01)
(Continued)

(52) U.S. Cl.
CPC ......... *H04N 19/157* (2014.11); *H04N 19/129* (2014.11); *H04N 19/13* (2014.11);
(Continued)

(58) Field of Classification Search
CPC .... H04N 19/129; H04N 19/157; H04N 19/13; H04N 19/176; H04N 19/196; H04N 19/46; H04N 19/463; H04N 19/70
(Continued)

(56) References Cited

U.S. PATENT DOCUMENTS

| 1,679,903 A | 8/1928 | Holinger |
| 5,295,203 A | 3/1994 | Krause et al. |

(Continued)

FOREIGN PATENT DOCUMENTS

| CN | 1252675 A | 5/2000 |
| CN | 1719903 A | 1/2006 |

(Continued)

OTHER PUBLICATIONS

Extended European Search Report dated Mar. 20, 2019 in EP Application No, 18196663.1, 15 pages.
(Continued)

*Primary Examiner* — Albert Kir
(74) *Attorney, Agent, or Firm* — Shumaker & Sieffert, P.A.

(57) ABSTRACT

In one example, an apparatus is disclosed for coding coefficients associated with a block of video data during a video coding process, the apparatus comprising a video coder configured to code information that identifies a scanning order associated with the block, wherein to code the information that identifies the scanning order associated with the block, the video coder is configured to determine a most probable scanning order for the block, and code an indication of whether the scanning order associated with the block is the most probable scanning order. In another example, to code the information that identifies the scanning order associated with the block, the video coder is further configured to, in the event the scanning order associated with the
(Continued)

block is not the most probable scanning order, code an indication of the scanning order associated with the block.

19 Claims, 9 Drawing Sheets

Related U.S. Application Data

(60) Provisional application No. 61/426,431, filed on Dec. 22, 2010, provisional application No. 61/426,426, filed on Dec. 22, 2010, provisional application No. 61/547,530, filed on Oct. 14, 2011.

(51) Int. Cl.
| | | |
|---|---|---|
| *H04N 19/70* | (2014.01) | |
| *H04N 19/176* | (2014.01) | |
| *H04N 19/46* | (2014.01) | |
| *H04N 19/196* | (2014.01) | |
| *H04N 19/463* | (2014.01) | |
| *H04N 19/13* | (2014.01) | |

(52) U.S. Cl.
CPC ......... *H04N 19/176* (2014.11); *H04N 19/196* (2014.11); *H04N 19/46* (2014.11); *H04N 19/463* (2014.11); *H04N 19/70* (2014.11)

(58) Field of Classification Search
USPC .................................................. 375/240.13
See application file for complete search history.

(56) References Cited

U.S. PATENT DOCUMENTS

| | | | |
|---|---|---|---|
| 5,583,657 A | 12/1996 | Jeong | |
| 5,631,744 A | 5/1997 | Takeuchi et al. | |
| 5,732,156 A | 3/1998 | Watanabe et al. | |
| 5,818,877 A | 10/1998 | Tsai et al. | |
| 5,838,825 A | 11/1998 | Obayashi et al. | |
| 5,852,469 A | 12/1998 | Nagai et al. | |
| 6,054,943 A | 4/2000 | Lawrence | |
| 6,263,026 B1* | 7/2001 | Je-Chang ............... H04N 19/18 | |
| | | | 375/240.23 |
| 6,301,304 B1 | 10/2001 | Jing et al. | |
| 6,532,306 B1 | 3/2003 | Boon et al. | |
| 6,646,578 B1 | 11/2003 | Au | |
| 6,680,974 B1 | 1/2004 | Faryar et al. | |
| 6,680,975 B1* | 1/2004 | Jeong ................... H04N 19/176 | |
| | | | 375/240.23 |
| 6,771,828 B1 | 8/2004 | Malvar | |
| 6,775,414 B1 | 8/2004 | Fogg et al. | |
| 6,795,584 B2 | 9/2004 | Karczewicz et al. | |
| 6,850,649 B1 | 2/2005 | Malvar | |
| 6,856,701 B2 | 2/2005 | Karczewicz et al. | |
| 6,870,963 B2 | 3/2005 | Govindaswamy et al. | |
| 7,113,646 B2 | 9/2006 | Youn | |
| 7,369,066 B1 | 5/2008 | Benzreba et al. | |
| 7,376,280 B2 | 5/2008 | Handley et al. | |
| 7,379,608 B2 | 5/2008 | Marpe et al. | |
| 7,483,575 B2 | 1/2009 | Fukuhara et al. | |
| 7,522,774 B2 | 4/2009 | Ramasastry et al. | |
| 7,535,387 B1 | 5/2009 | Delva | |
| 7,609,904 B2 | 10/2009 | Miller | |
| 7,702,013 B2 | 4/2010 | Schwarz et al. | |
| 7,813,567 B2 | 10/2010 | Sankaran | |
| 7,843,998 B2 | 11/2010 | Bjontegaard | |
| 7,885,473 B2 | 2/2011 | Sankaran | |
| 7,920,629 B2 | 4/2011 | Bjontegaard et al. | |
| 8,311,119 B2 | 11/2012 | Srinivasan | |
| 8,446,301 B2 | 5/2013 | He et al. | |
| 8,483,282 B2 | 7/2013 | Karczewicz et al. | |
| 8,619,853 B2 | 12/2013 | Ye et al. | |
| 8,687,904 B2 | 4/2014 | Sasai et al. | |
| 8,861,599 B2 | 10/2014 | Auyeung et al. | |
| 8,913,662 B2* | 12/2014 | Karczewicz ......... H04N 19/463 | |
| | | | 375/240.13 |
| 8,913,666 B2 | 12/2014 | Sole et al. | |
| 8,976,861 B2 | 3/2015 | Sole et al. | |
| 9,042,440 B2 | 5/2015 | Sole et al. | |
| 9,049,444 B2 | 6/2015 | Zheng et al. | |
| 9,055,290 B2 | 6/2015 | Sole Rojals et al. | |
| 9,338,449 B2 | 5/2016 | Sole et al. | |
| 2002/0122483 A1 | 9/2002 | Tanaka et al. | |
| 2002/0163967 A1 | 11/2002 | Youn et al. | |
| 2002/0173952 A1 | 11/2002 | Mietens et al. | |
| 2003/0016876 A1 | 1/2003 | Chai et al. | |
| 2003/0048208 A1 | 3/2003 | Karczewicz | |
| 2003/0128886 A1 | 7/2003 | Said | |
| 2004/0022446 A1 | 2/2004 | Taubman | |
| 2004/0131272 A1 | 7/2004 | Kobayashi et al. | |
| 2004/0184544 A1 | 9/2004 | Kondo et al. | |
| 2005/0036549 A1* | 2/2005 | He ....................... H04N 19/159 | |
| | | | 375/240.12 |
| 2005/0068208 A1 | 3/2005 | Liang et al. | |
| 2005/0078754 A1 | 4/2005 | Liang et al. | |
| 2006/0044317 A1 | 3/2006 | Bourd et al. | |
| 2006/0078049 A1 | 4/2006 | Bao et al. | |
| 2006/0227865 A1 | 10/2006 | Sherigar | |
| 2006/0256854 A1 | 11/2006 | Jiang | |
| 2007/0036223 A1 | 2/2007 | Srinivasan | |
| 2007/0053426 A1 | 3/2007 | Lee et al. | |
| 2007/0071331 A1 | 3/2007 | Liu | |
| 2007/0285285 A1 | 12/2007 | Puri et al. | |
| 2008/0002767 A1 | 1/2008 | Schwarz et al. | |
| 2008/0013622 A1 | 1/2008 | Bao et al. | |
| 2008/0013633 A1 | 1/2008 | Ye et al. | |
| 2008/0089421 A1 | 4/2008 | Jeong et al. | |
| 2008/0089425 A1 | 4/2008 | Karczewicz | |
| 2008/0152015 A1 | 6/2008 | Benzreba et al. | |
| 2008/0219578 A1 | 9/2008 | Lee | |
| 2008/0310504 A1 | 12/2008 | Ye et al. | |
| 2008/0310507 A1 | 12/2008 | Ye et al. | |
| 2008/0310745 A1 | 12/2008 | Ye et al. | |
| 2009/0067503 A1 | 3/2009 | Jeong et al. | |
| 2009/0154820 A1 | 6/2009 | Li et al. | |
| 2009/0175331 A1 | 7/2009 | Karczewicz et al. | |
| 2009/0175332 A1 | 7/2009 | Karczewicz et al. | |
| 2009/0201994 A1 | 8/2009 | Schwarz et al. | |
| 2009/0201995 A1 | 8/2009 | Schwarz et al. | |
| 2009/0201996 A1 | 8/2009 | Schwarz et al. | |
| 2009/0202158 A1 | 8/2009 | Hwang et al. | |
| 2009/0232204 A1 | 9/2009 | Lee et al. | |
| 2009/0232211 A1 | 9/2009 | Chen et al. | |
| 2009/0257489 A1 | 10/2009 | Karczewicz et al. | |
| 2009/0273706 A1 | 11/2009 | Tu et al. | |
| 2009/0273796 A1 | 11/2009 | Garben et al. | |
| 2010/0020867 A1 | 1/2010 | Wiegand et al. | |
| 2010/0040148 A1 | 2/2010 | Marpe et al. | |
| 2010/0046626 A1 | 2/2010 | Tu et al. | |
| 2010/0097248 A1 | 4/2010 | Sze et al. | |
| 2010/0097250 A1 | 4/2010 | Demircin et al. | |
| 2010/0098155 A1 | 4/2010 | Demircin et al. | |
| 2010/0111432 A1 | 5/2010 | Mohr | |
| 2010/0118971 A1 | 5/2010 | Tanida et al. | |
| 2010/0124284 A1 | 5/2010 | Lee et al. | |
| 2010/0135389 A1 | 6/2010 | Tanizawa et al. | |
| 2010/0141489 A1 | 6/2010 | Reznik | |
| 2010/0150226 A1 | 6/2010 | Hallapuro et al. | |
| 2010/0177820 A1 | 7/2010 | Chono et al. | |
| 2010/0284459 A1 | 11/2010 | Jeong et al. | |
| 2010/0324912 A1 | 12/2010 | Choo et al. | |
| 2011/0001643 A1 | 1/2011 | Sze et al. | |
| 2011/0080956 A1 | 4/2011 | Zhou et al. | |
| 2011/0090955 A1 | 4/2011 | Liu et al. | |
| 2011/0096834 A1 | 4/2011 | Cheon et al. | |
| 2011/0097003 A1 | 4/2011 | Alshina et al. | |
| 2011/0103489 A1 | 5/2011 | Takada | |
| 2011/0158315 A1* | 6/2011 | Kim ......................... H04N 19/503 | |
| | | | 375/240.03 |
| 2011/0206135 A1 | 8/2011 | Drugeon et al. | |
| 2011/0206289 A1 | 8/2011 | Dikbas et al. | |
| 2011/0243220 A1 | 10/2011 | Seregin et al. | |

(56) References Cited

U.S. PATENT DOCUMENTS

| | | | |
|---|---|---|---|
| 2011/0249726 A1* | 10/2011 | Nguyen | H04N 19/157 375/240.03 |
| 2011/0249755 A1 | 10/2011 | Shibahara et al. | |
| 2011/0255799 A1 | 10/2011 | Omori | |
| 2011/0268183 A1 | 11/2011 | Sole et al. | |
| 2011/0280314 A1 | 11/2011 | Sankaran et al. | |
| 2012/0008683 A1 | 1/2012 | Karczewicz et al. | |
| 2012/0027081 A1 | 2/2012 | Endresen et al. | |
| 2012/0082233 A1 | 4/2012 | Sze et al. | |
| 2012/0082235 A1* | 4/2012 | Lou | H04N 19/129 375/240.18 |
| 2012/0121011 A1 | 5/2012 | Coban et al. | |
| 2012/0163455 A1* | 6/2012 | Zheng | H04N 19/146 375/240.13 |
| 2012/0163456 A1 | 6/2012 | Coban et al. | |
| 2012/0163469 A1 | 6/2012 | Kim et al. | |
| 2012/0163472 A1 | 6/2012 | Sole Rojals et al. | |
| 2012/0183052 A1 | 7/2012 | Lou et al. | |
| 2012/0201303 A1 | 8/2012 | Yang et al. | |
| 2012/0207400 A1 | 8/2012 | Sasai et al. | |
| 2012/0230417 A1 | 9/2012 | Sole Rojals et al. | |
| 2012/0230418 A1 | 9/2012 | Sole et al. | |
| 2012/0230420 A1 | 9/2012 | Sole Rojals et al. | |
| 2012/0236929 A1 | 9/2012 | Liu | |
| 2012/0262313 A1 | 10/2012 | He et al. | |
| 2012/0269263 A1 | 10/2012 | Bordes et al. | |
| 2012/0288003 A1 | 11/2012 | Do et al. | |
| 2013/0003834 A1 | 1/2013 | Jals et al. | |
| 2013/0003835 A1 | 1/2013 | Sole et al. | |
| 2013/0051459 A1 | 2/2013 | Kirchhoffer et al. | |
| 2013/0051472 A1 | 2/2013 | Wiegand et al. | |
| 2013/0051475 A1 | 2/2013 | Joshi et al. | |
| 2013/0058407 A1 | 3/2013 | Sole et al. | |
| 2013/0114731 A1 | 5/2013 | Lee | |
| 2013/0182772 A1 | 7/2013 | Seregin et al. | |
| 2013/0188699 A1 | 7/2013 | Joshi et al. | |
| 2013/0230097 A1 | 9/2013 | Sole Rojals et al. | |
| 2013/0343454 A1 | 12/2013 | Yeo et al. | |
| 2014/0086307 A1 | 3/2014 | Karczewicz et al. | |
| 2014/0307777 A1 | 10/2014 | Sole et al. | |
| 2014/0362925 A1 | 12/2014 | Nguyen et al. | |

FOREIGN PATENT DOCUMENTS

| | | | |
|---|---|---|---|
| CN | 1725859 A | 1/2006 | |
| CN | 1735209 A | 2/2006 | |
| CN | 1860796 A | 11/2006 | |
| CN | 1910931 A | 2/2007 | |
| CN | 1980395 A | 6/2007 | |
| CN | 101032172 A | 9/2007 | |
| CN | 101039435 A | 9/2007 | |
| CN | 101262603 A | 9/2008 | |
| CN | 101606391 A | 12/2009 | |
| CN | 102045560 A | 5/2011 | |
| EP | 1041826 A1 | 10/2000 | |
| EP | 1679903 | 7/2006 | |
| EP | 1679903 A3 * | 7/2006 | H04N 19/136 |
| EP | 1768415 A1 | 3/2007 | |
| EP | 2154894 A1 | 2/2010 | |
| EP | 2182732 A1 | 5/2010 | |
| EP | 2592832 | 5/2013 | |
| EP | 2677750 | 12/2013 | |
| JP | 2000013609 | 1/2000 | |
| JP | 2003224851 | 8/2003 | |
| JP | 2005530375 A | 10/2005 | |
| JP | 2006211304 | 8/2006 | |
| JP | 4166805 B2 | 10/2008 | |
| JP | 2010004284 | 1/2010 | |
| JP | 2013537737 | 10/2013 | |
| KR | 2008-0016413 | 2/2008 | |
| KR | 10-2009-0099236 | 9/2009 | |
| RU | 2330325 | 7/2008 | |
| WO | 2002104039 A1 | 12/2002 | |
| WO | 2007043583 | 4/2007 | |
| WO | 2007063472 | 6/2007 | |
| WO | 2007079782 | 7/2007 | |
| WO | 2008157268 A2 | 12/2008 | |
| WO | 2008157360 A2 | 12/2008 | |
| WO | 2009049260 A2 | 4/2009 | |
| WO | 2009075445 A1 | 6/2009 | |
| WO | 2009134575 | 11/2009 | |
| WO | 2010018138 | 2/2010 | |
| WO | 2010131546 A1 | 11/2010 | |
| WO | 2010143853 | 12/2010 | |
| WO | 2011053020 A2 | 5/2011 | |
| WO | 2011128268 | 10/2011 | |
| WO | 2011128303 | 10/2011 | |
| WO | 2012005551 | 1/2012 | |
| WO | 2012051033 | 4/2012 | |
| WO | 2012075181 | 6/2012 | |
| WO | 2013006446 | 1/2013 | |

OTHER PUBLICATIONS

Extended European Search Report dated Jun. 18, 2018 in EP Application No. 18165549.9, 13 pages.

European Office Action dated Oct. 19, 2017 in EP 11807841.9, 7 pages.

Search Report dated Apr. 2, 2018 in AE Application No. 583/2013, 5 pages.

Second Written Opinion of international application No. PCT/US2011/062700. dated Nov. 27, 2012, 14pp.

Second Written Opinion of international application No. PCT/US2011/066609, dated Nov. 28, 2012, 8 pp.

Examination Report dated Apr. 2, 2018 in AE Application No. 583/2013, 9 page.

Examination Report dated Apr. 6, 2018 in IN Application No. 3851/CHENP/2013.

Indian First Examination Report dated Mar. 15, 2018 in IN 3770/CHENP/2013 and English translation, 7 pages.

International Preliminary Report on Patentability—PCT/US2011/066609, The International Bueureau of WIPO—Geneva, Switzerland—Mar. 28, 2013, 24 pp.

International Search Report and Written Opinion—PCT/US2011/066609—ISA/EPO—May 10, 2012, 20 PP.

Invitation to Pay Additional Fees from international application No. PCT/US2011/066609, dated Mar. 1, 2012, 10 PP.

Invitation to Pay Additional Fees and Partial Search Report of international applic PCT/US2011/066609, dated Mar. 1, 2012, 10 pp.

U.S. Appl. No. 13/413,472, by Joel Sole Rojals, filed Mar. 6, 2012.
U.S. Appl. No. 13/413,497, by Joel Sole Rojals, filed Mar. 6, 2012.
U.S. Appl. No. 13/413,514, by Joel Sole Rojals, filed Mar. 6, 2012.
U.S. Appl. No. 13/413,526, by Joel Sole Rojals, filed Mar. 6, 2012.
U.S. Appl. No. 13/302,996, by Joel Sole Rojals, filed Nov. 22, 2011.
U.S. Appl. No. 13/332,300, by Joel Sole Rojals, filed Dec. 20, 2011.
U.S. Appl. No. 13/303,015, by Joel Sole Rojals, filed Nov. 22, 2011.

Nguyen et al., "Multi-level significance maps for Large Transform Units" JCTVC-G644, Joint Collaborative Team on Video Coding (JCT-VC) ofITU-T SG16 WP3 and ISO/IEC JTC1/SC29/WG11, 7th Meeting: Geneva, Nov. 21-30, 2011, 11 pages.

Y. Wei et al., "A High Performance CABAC Decoding Architecture" IEEE Transactions on Consumer Electronics, vol. 51, No. 5, Dec. 19, 2005, 2 pages (abstract).

Lou et al., "Parallel processing friendly context modeling for significance map coding in CABAG", JCT-VC Meeting,MPEG Meeting, Jan. 20-28, 2011, Daegu, (Joint Collaborative Team on Video Coding of ISO/IEC JTC1/SC29/WG11 and ITU-T SG.16, URL: http://wftp3.itu.int/av-arch/jctvc-site/, No. JCTVC-D241, XP030008281, 4 pp.

Auyeung, et al.: "Parallel processing friendly simplified context selection of significance map", JCT-VC Meeting; MPEG Meeting; Jan. 20-28, 2011; Daegu; (Joint Collaborative Team on Video Coding of ISO/IEC JTC1/SC29/WG11 and ITU-T SG.16); URL: http://wftp3.itu.int/av-arch/jctvc-site/, No. JCTVC-D260, XP030008300, 6 pp.

(56) References Cited

OTHER PUBLICATIONS

Bossen, "Common test conditions and software reference configurations," Document: JCTVC-B300, 2nd Meeting: Geneva, CH, 21-28, Jul. 2010, 12 pages.
Bross, et al., "High Efficiency Video Coding (HEVC) text specification draft 10 (for FDIS & Last Call)", Joint Collaborative Team on Video Coding {JCT-VC) of ITU-T SG16 WP3 and ISO/IEC JTC1/SC29/WG11, JCTVC-L1003_v34, 12th Meeting: Geneva, CH, Jan. 14-23, 2013, 310 pp. [uploaded in parts].
Budagavi, et al., "Description of video coding technology proposal by Texas Instruments Inc.", JCTVC-A101, Joint Collaborative Team on Video Coding meeting, Apr. 15-23, 2010, Dresden, Germany, 45 pp.
Budagavi, et al., "Parallel Context Processing techniques for high coding efficiency entropy coding in HEVC", Joint Collaborative Team on Video Coding (JCT-VC) of ITU-T SG16 WP3 and ISO/IEC JTC1/SC29/WG11, 2nd Meeting: Geneva, CH, Jul. 21-28, 2010, JCTVC-B088_r1, 11 pp.
Chujoh, et al., "Video coding technology proposal by Toshiba", JCT-VC Meeting; Apr. 15-23, 2010; Dresden; (Jointcollaborative Team on Video Coding of ISO/IEC JTC1/SC29/WG11 and ITU-TSG.16); XP030007558, XP030007559, ISSN: 0000-0049, 38 pp.
He, et al., "Video Coding Technology Proposal by RIM," JCTVC-A120, Joint Collaborative Team on Video Coding meeting, Apr. 15-23, 2010, Dresden, Germany, 29 pp.
Sze, et al., "Test Model under Consideration", JCTVC-A205, Joint Collaborative Team on Video Coding meeting, Apr. 15-23, 2010, Dresden, Germany, 171 pp_ [uploaded in parts].
Jia et al., "Adaptive Transform Coefficient Scan for H.264 Intra Coding," IEICE Trans. Inf. & Syst., vol. E90-D, No. 10, Oct. 2007, pp. 1709-1711.
Karczewicz, et al., "Video coding technology proposal by Qualcomm", JCT-VC Meeting; Apr. 15-23, 2010; Dresden; (Joint Collaborative Team on Video Coding of ISO/IEC JTC1/SC29/WG11 and ITU-TSG.16); URL: http://wftp3.itu.int/av-arch/jctvc-site/, No. XP030007566, XP030007567, 24 pp.
Kung et al., "Block based parallel motion estimation using programmable graphics hardware", Audio, Language and Image Processing, 2008. ICALIP 2008. Iniernational Conference on, Piscataway, NJ, USA, Jul. 2008, XP031298532, pp. 599-603.
Lee et al., "Adaptive Scanning for H.264/AVC Intra Coding," ETRI Journal, vol. 28, No. 5, Oct. 2006, pp. 668-671.
Lee, et al., "Efficient coefficient coding method for large transform in VLC mode", Joint Collaborative Team on Video Coding (JCT-VG) of ITU-T SG16 WP3 and ISO/IEC JTC1/SC29/WG11, 3rd Meeting: Guangzhou, CN, Oct. 2010, JCTVC-C210, 6 PP.
Lou et al., "Zigzag scan for CABAG/PIPE", MPEG Meeting; Oct. 7-15, 2010; Guangzhou; (Motion Picture Expert Group or ISO/IEC JTC1/SC29/WG11) No. M18137, Document: JCTVC-C114, XP030046727, 4 pp.
Cheung, et al., "Highly Parallel Rate-Distortion Optimized Intra-Mode Decision on Multicore Graphics Processor", IEEE Transactions On Circuits and Systems for Video Technology, IEEE Service Center, Piscataway, NJ, US, vol. 19, No. 11, XP011276003, pp. 1692-1703.
Qualcomm Technologies Inc: "Snapdragon 810 Processor Product Brief,"retrieved from https://www.qualcomm.com/documents/snapdragon-810-processor-product-brief, May 28, 2014, 2 pp.
Segall, et al., "A Highly Efficient and Highly Parallel System for Video Coding", Joint Collaborative Team on Video Coding (JCT-VC) of ITU-T SG16 WP3 and ISO/IEC JTC1/SC29/WG11, Apr. 15-23, 2010, Document: JCTVC-A105, 49 PP.
Seregin, et.al., "Utilisation of CABAG equal probability mode for intra modes coding", Joint Collaborative Team on Video Coding (JCT-VC) of ITU-T SG16 WP3 and ISO/IEC JTC1/SC29/WG11, version 3, Document: JCTVC-F376, Jul. 16, 2011, 3 PP.
Sole, et al., "CE11: Parallel Context Processing for the significance map in high coding efficiency", JCT-VG Meeting; MPEG Meeting; Mar. 16, 2011-Mar. 23, 2011; Geneva; (Joint Collaborative Team on Video Coding of ISO/IEC JTC1/SC29/WG11and ITU-T SG.16); URL: http://wftp3.itu.int/av-arch/jctvc-site/ No. JCTVC-E338, XP030008844, 4 pp.
Sze et al., "Massively Parallel CABAG," Document VCEG-AL21, 38th Meeting: London, UKI Geneva, CH, Jul. 1-8, 2009, 10 PP.
Sze, et al., "TE12: Evaluation of transform coefficient coding (HHI_Transform_Coding with tool breakdown", JCTVC-C059, 3rd JCT-VC Meeting, Guangzhou, CN, Oct. 7-14, 2010, 10 pp.
Sze, et al., "Parallel CABAG", ITU-T SG 16/Q.6 Doc. COM16-C334, Geneva, Switzerland, Apr. 2008, 10 pp.
Tu, et al., "Context-Based Entropy Coding of Block Transform Coefficients for Image Compression", IEEE Transactions on Image Processing, Nov. 2002, vol. 11, No. 11, pp. 1271-1283.
Marpe, et al. "Context-Based Adaptive Binary Arithmetic Coding in the H.264/AVC Video Compression Standard," IEEE Transactions on Image Processing, vol. 13, No. 7, Jul. 2003, pp. 620-636.
Turaga, et al., "Parallel processing of multi-dimensional data with causal neighborhood dependencies", VCIP-SPIE, vol. 6822, No. 6822-19, Jan. 28, 2008, XP040431672, 7 pp.
Sze, et al., "Parallelization of HHI_Transform_Coding", Joint Collaborative Team on Video Coding (JCT-VC) of ITU-T SG16 WP3 and ISO/IEC JTC1/SC29/WG11, 3rd Meeting: Guangzhou, CN, Oct. 7-14, 2010, Document: JCTVC-C227, 11 PP.
Sze, "Te 8: Evaluation of RIM parallel context processing (PCP) proposal", Joint Collaborative Team on Video Coding (JCT-VC) of ITU-T SG16 WP3 and ISO/IEC JTC1/SC29/WG11, 3rd Meeting: Guangzhou, CN, Oct. 7-14, 2010, Document: JCTVC-C063, 4 pp.
Yeo et al., "Mode-Dependent Coefficient Scanning for Intra Prediction Residual Coding", JCT-VC Meeting; MPEG Meeting; Jan. 20-28, 2011; Daegu; (Joint Collaborative Team on Video Coding of ISO/IEC JTC1/SC29/WG11and ITU-T SG.16); No. JCTVC-D049, XP030008090, 7 pp.
Yu, et al: "Adaptive Scan for Large Blocks for HEVC", JCT-VC Meeting; MPEG Meeting; Jul. 14-22, 2011; Torino; {Joint Collaborative Team on Video Coding of ISO/IEC JTC1/SC29/WG11 and ITU-T SG.16 ); No. JCTVC-F569_r2, XP030009592, 6 pp.
Wei et al., "Adaptive mode-dependent scan for H.264/AVC intracoding", Journal of Electronic Imaging, Aug. 2010, vol. 19, No. 3, XP040541799, 12 pp.
Zeng et al., "Directional Discrete Cosine Transforms for Image Coding", IEEE International Conference on Multimedia and Expo (ICME 2006), Jul. 2006, IEEE, XP031032937, pp. 721-724.
Budagavi et al., "TES: T1 Parallel context processing (PCP) proposal," JCTVC-C062, Oct. 7-15, 2010, 7 pp.
International Telecommunication Union, "ITU-T H.265, Series H: Audiovisual and Multimedia Systems, Infrastructure of audiovisual services—Coding of moving video, Advanced video coding for generic audiovisual services," Apr. 2013, 317 pp.
Marpe et al., "Novel entropy coding concept," Document JCTVC-A032, 1st Meeting: Dresden, DE, Apr. 15-23, 2010, 17pp.
Seregin et al., "Low-complexity adaptive coefficients scanning", Joint Collaborative Team on Video Coding (JCT-VC) of ITU-T SG16 WP3 and ISO/IEC JTC1/SC29/WG11, vol. JCTVC-C205, Oct. 7-15, 2010, XP055012689.
U.S. Appl. No. 14/448,936, by Sole Rojals; Joel, et al., filed Jul. 31, 2014.
Joshi et al., "Mode dependent intra residual coding," Joint Collaborative Team on Video Coding (JCT-VC) of ITU-T SG16 WP3 and ISO/IEC JTC1/SC29/WG11, Document: JCTVC-D392, Jan. 20-28, 2011, 5 pp.
Sasai et al., "Simplified Context Modeling for Transform Coefficient Coding," Joint Collaborative Team on Video Coding (JCT-VC) of ITU-T SG16 WP3 and ISO/IEC JTC1/SC29/WG11, Document: JCTVC-D185, Jan. 20-28, 2011, 5 pp.
Sze, "Context selection complexity in HEVC CABAG," JCT-VC Meeting; MPEG Meeting; Jan. 20, 2011-Jan. 28, 2011; Daegu;(Joint Collaborative Team on Video Coding of ISO/IEC JTC1/SC29/WG11and ITU-T SG.16 ); URL: http://wftp3.itu.int/av-arch/jctvc-site/ No. Document: JCTVC-D244, Jan. 20-28, 2011, 3 pp.
Ye et al., "Improved H.264 Intra Coding Based on Bi-Directional Intra Prediction, Directional Transform, and Adaptive Coefficient Scanning," 15th IEEE International Conference on Image Processing, ICIP 2008, Oct. 12-15, 2008, 4 PP.

(56) References Cited

OTHER PUBLICATIONS

Zheng et al., "CE11: Mode Dependent Coefficient Scanning," JCT-VC Meeting; MPEG Meeting; Jan. 20, 2011-Jan. 28, 2011; Daegu; {Joint Collaborative Team on Video Coding of ISO/IEC JTC1/SC29/WG11and ITU-T SG.16); No. Document: JCTVC-D393, Jan. 20-28, 2011, 4 pp.

Auyeung et al., "Context reduction of the last transform position in JCTVC-D262 for CE11.1", JCT-VC meeting; Mpeg meeting; Mar. 16-23, 2011; Geneva; (Joint Collaborative Team on Video Coding of ISO/IEC JTC1/SC29/WG11and ITU-T SG.16); URL: http://wftp3.itu.int/av-arch/jctvc-she/ No. JCTVC-E344, XP030008850, ISSN: 0000-0005, 6 pp.

Wei, et al., "Context Probability Modeling for Encoding Quantized Transform Coefficients", PCS2006, Entropy Coding Special Session, Apr. 30, 2006, 6 pp.

"Recommendation ITU-T H.264, Advanced video coding for generic audiovisual services", Series H: Audiovisual and Multimedia Systems, Infrastructure of audiovisual services—Coding of moving video, Mar. 2010, p. 62.

ITU-T H.265, Series H: Audiovisual and Multimedia Systems, Infrastructure of audiovisual services—Coding of moving video, Advanced video coding for generic audiovisual services, The International Telecommunication Union, Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Bjontegaard et al., "Context-Adaptive VLC (CVLC) Coding of Coefficients (JVT-C028)", Joint Video Team (JVT) of ISO/IEC MPEG & ITU-T VCEG (ISO/IEC JTC1/SC29/WG11 and ITU-T SG16 Q6), May 6, 2002, pp. 1-8, XP002257292.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Budagavi Met al.,"Parallel context processing techniques for high coding efficiency entropy coding in HEVC", 2. JCT-VC Meeting; Jul. 21, 2010-Jul. 28, 2010; Geneva; (Joint Collaborativeteam on Video Coding of ISO/ IEC JTCI/SC29/WGII and ITU-T SG.16 ); URL:http://wftp3.itu.int/av-arch/jctvc-sit e/ 3 No. JCTVC-B0BB, Jul. 24, 2010 {Jul. 24, 2010), XP030007668, ISSN: 0000-0046.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674pp.

Joshi, R., et al., "CE7: Mode dependent intra residual coding",96. MPEG Meeting; Mar. 21, 2011-Mar. 25, 2011; Geneva; (Motion Picture Expert Group or ISO/IEC JTC1/SC29/WG11),No. m19613, Mar. 17, 2011 (Mar. 17, 2011), XP030048180.

Marpe, D., et al., "Unified PIPE-Based Entropy Coding for HEVC",6. JCT-VC Meeting; 97. MPEG Meeting;Jul. 14, 2011-Jul. 22, 2011; Torino; (Joint Collaborative Team on Video Coding of ISO/IECJTC1/SC29/WG11 and ITU-T SG.16);URL:http://wftp3.itu.int/av-arch/jctvc-site/,No. JCTVC-F268, Jul. 15, 2011 (Jul. 15, 2011),XP030009291.

Nguyen Tung et al: "Improved Context Modeling for Coding Quantized Transform Coefficients in Video Compression", Dec. 8, 2010, Picture Coding Symposium, XP030082008.

Nguyen N., et al., "Context Set Selection for Coefficient Level Coding", 8. JCT-VG Meeting; 99. MPEG Meeting; Jan. 2, 2012-Oct. 2, 2012; San Jose; (Joint Collaborative Team on Video Coding of ISO/I EC JTCI/SC29/ WGII and ITU-T SG. 16); URL: http://wftp3.itu.int/av-arch/jctvc-site/, No. JCTVC-H0404, Jan. 20, 2012 (Jan. 20, 2012), XP030111431.

Nguyen, T., et al., "Reduced-complexity entropy coding of transform coefficient levels using a combination of VLC and PIPE", 95. MPEG Meeting; Jan. 24, 2011-Jan. 28, 2011;Daegu; (Motion Picture Expert Group or ISO/IEC JTC1/SC29/WG11),No. m19102, Jan. 26, 2011 (Jan. 26, 2011), XP030047669.

Sole et al., "Unified scans for the significance map and coefficient level coding in high coding efficiency," Document JCTVC-E335, 5th Meeting: Geneva, CH, Mar. 16-23, 2011, 5 pp.

Sole, J., et al., "CE11: Parallel Context Processing for the significance map in high coding efficiency", 96. MPEG Meeting; Mar. 21, 2011-Mar. 25, 2011; Geneva; (Motion Picture Expert Group or ISO/IEC JTC1/SC29/WG11), No. ml9866, Mar. 17, 2011 (Mar. 17, 2011),XP030048433.

Sole, J., et al., "CE11: Removal of the parsing dependency of residual coding on intra mode", 98. MPEG Meeting; Nov. 28, 2011-Dec. 2, 2011; Geneva; (Motion Picture Expert Group or ISO/IEC JTC1/SC29/WG11),No. m21883, Nov. 19, 2011 (Nov. 19, 2011), XP030050446.

Sole, J., et al., "Parallel Context Processing for the significance map in high coding efficiency",95. MPEG Meeting; Jan. 24, 2011-Jan. 28, 2011; Daegu; (Motion Picture Expert Group or ISO/IEC JTC1/SC29/WG11) No. m19026 Jan. 21, 2011 (Jan. 21, 2011), XP030047594.

Sole J., et al.,"Parallel processing of residual data in HE", 6. JCT-VG Meeting; 97. MPEG Meeting; Jul. 14, 2011-Jul. 22, 2011; Torino; (Joint Collaborative Team on Video Coding of ISO/ IEC JTCI/SC29/WGII and ITU-T SG. 16); URL: http://wftp3.itu.int/av-arch/jctvc-site/, No. JCTVC-F552, Jul. 16, 2011 (Jul. 16, 2011), XP03000957.

Sole, J., et al., "Removal of the parsing dependency of residual coding on intra mode", 6. JCT-VG Meeting; 97. MPEG Meeting;Jul. 14, 2011-Jul. 22, 2011; Torino; (Joint Collaborative Team on Video Coding of ISO/ IEC JTC1/SC29/WG11 and ITU-T SG.16 ); URL:http://wftp3.itu.int/av-arch/jctvc-site/,No. JCTVC-F550, Jul. 17, 2011 {Jul. 17, 2011), XP030009573.

Sole, J., et al.,"CE11: Scanning Passes of Residual Data in HE", 7. JCT-VG Meeting; 98. MPEG Meeting; Nov. 21, 2011-Nov. 30, 2011; Geneva; (Joint Collaborative Team on Video Coding of ISO/IEC JTCI/SC29/ WG11 and ITU-T SG. 16); URL: http://wftp3. itu.int/av-arch/jctvc-site/, , No. JCTVC-G320, Nov. 9, 2011 {Nov. 9, 2011), XP030110304.

Sole, J. et al., "CE11: Unified scans for the significance map and coefficient level coding in high efficiency", JCTVC-F288, Joint Collaborative Team on Video Coding (JCT-VG) of ITU-T SG16 WP3 and ISO/IEC JTC1/SC29/WG11, 6th Meeting: Torino (Italy), Jul. 2011.

Sze, V., et al., "Parallel Context Processing of Coefficient Level", 6. JCT-VC MEETING;97. MPEG Meeting; Jul. 14, 2011-Jul. 22, 2011; Torino; (Joint Collaborative Team on Video Coding of ISO/IEC JTC1/SC29/ WG11 and ITU-T SG.16 );URL: http://wftp3.itu.int/av-arch/jctvc-site/, No. JCTVC-F130, Jul. 22, 2011 (Jul. 22, 2011), XP030009153.

Thomas Davies: "Unified scan processing for high efficiency coefficient coding", 4. JCT-VC Meeting; 95. MPEG Meeting; Jan. 20, 2011-Jan. 28, 2011; Daegu; (Joint Collaborative Team on Video Coding of ISO/IEC JTC1/ SC29/WG11and ITU-T SG. 16); Jan. 15, 2011, XP030008259, ISSN: 0000-0013. URL: http://wftp3. itu. int/av-arch/jc tvc-site/, No. JCTVC-D219.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://fVvftp3.itu.int/av-arch/jctvc-site/2011_01_D_Daegu/ [retrieved on Jul. 11, 2012].

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

Zhang L, et al., "Context-Based Entropy Coding in Avs Video Coding Standard", Signal Processing. Image Communication, Apr. 1, 2009, pp. 263-276, vol. 24, No. 4, Elsevier Science Publishers, XP026091625, ISSN:0923-5965, DOI: 10.1016.

Zhang W., et al., "NON-CE1: On CABAG parsing throughput",8. JCT-VG Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16); URL: http://avftp3.itu.int/av-arch/jctvc-site/, No. JCTVC-H0533, Jan. 30, 2012 (Jan. 30, 2012), XP030111560,.

(56) References Cited

OTHER PUBLICATIONS

Ye, Y. et al., "Improved intra coding," International Telecommunications Union—Telecommunications Standardization Sector, Document VCEG-AG11, Oct. 20, 2007, 6 pp.
Choi, B.D. et al., "Adaptive Coefficient Scanning Based on the Intra Prediction Mode," ETRI Journal, vol. 29, No. 5, Oct. 2007, 3 pp.
Jie J., et al., "A most probable scan mode decision for H.264/AVC inter picture coding," IEEE International Conference on Computer Science and Information Technology, Aug. 2009, 5 pp.
Puri, A. et al., "Improvements in OCT Based Video Coding," Proceedings of SPIE, vol. 3024, Feb. 12, 1997, 13 pp.
Shim, S.Y. et al., Adaptive Scanning Patterns for Intra Prediction International Telecommunications Union-Telecommunications Standardization Sector, Document VCEG-AH14, Jan. 12-13, 2008, 8 pp.
Marpe et al.: "Context-Based Adaptive Binary Arithmetic Coding in the H.264/AVC Video Compression Standard," IEEE Trans, Circuits System Video Technology, vol. 13, pp. 620-636, Jul. 2003.
Winken et al., "Video coding technology proposal by Fraunhofer HHI", 1. JCT-VC Meeting; Apr. 15, 2010-Apr. 23, 2010; Dresden; (Jointcollaborative Team on Video Coding of ISO/IEC JTC1/SC29/WG11 and ITU-TSG. 16); URL: http://WFTP3. ITU. INT/AV-ARCH/JCTVC-SITE/, No. XP030007556, Apr. 24, 2010 (Apr. 24, 2010), XP030007557.
McCann et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.
Misra et al., "A memory efficient method for fast transposing run-length encoded images", This paper appears in: Proceedings of the Fifth International Conference on Document Analysis and Recognition, 1999. ICDAR '99, Sep. 20-22, 1999.
Kim et al., "Efficient entropy coding scheme for H.264/AVC lossless video coding," Elsevier, Imaqe Communication, Apr. 24, 2010, 10 pp.
Davies, "BBC's Response to the Call for Proposals on Video Compression Technologies," JCTVC-A125, 1st meeting: Dresden, DE, Apr. 15-23, 2010, 30 pp.
ITU-T H.264, "Series H: Audiovisual and Multimedia Systems, Infrastructure of audiovisual services—Coding of moving video, Advanced video coding for generic audiovisual services," Mar. 2010, 669 pp.
Wiegand et al., "WD3: Working Draft 3 of High-Efficiency Video Coding," Document JCTVC-E603, 5th Meeting: Geneva, CH, Mar. 16-23, 2011, 193 pp.
Anonymous, "Test Model under Consideration," Joint Collaborative Team on Video Coding, Document: JCTVC-B205, Jul. 21-28, 2010, p. 150, paragraph 13,2,5-p. 151, paragraph 13,2.6.
Davies, T. et al., "Suggestion for a Test Model," Joint Collaborative Team on Video Coding, May 7, 2010, 30 pp.
Lee, J. et al., "An Efficient Encoding of OCT Blocks with Block-Adaptive Scanning," IEICE Transactions of Communications, vol. E77-B, No. 12, Dec. 1994, 6 pp.
Schaar-Mitreo, M. et al., "Novel Embedded Compression Algorithm for Memory Reduction in MPEG Codecs," SPIE Conference on Visual Communications, vol. 3653, Dec. 28, 1998, 10 pp.
Min, J. et al., "Adaptive significance map coding for large transform", Joint Collaborative Team on Video Coding, Document: JCTVC-F598, Jul. 14-22, 2011, 3 pp.
Seregin, V. et al., "Low-complexity adaptive coefficients scanning," Joint Collaborative Team on Video Coding, Document: JCTVC-C205, Oct. 7-15, 2010, 4 pp.
Sole Rojals, J. et al., "Parallel Context Processing for the significance map in high coding efficiency," Joint Collaborative Team on Video Coding, Document: JCTVC-D262, Jan. 16, 2011, 4 pp.
Sole Rojals, J. et al. "Parallel Context Processing for the significance map in high coding efficiency," Joint Collaborative Team on Video Coding, JCTVC-D262 PowerPoint, Jan. 20-28, 2011, 8 pp.

Winken, M. et al., "Video Coding Technology Proposal by Fraunhofer HHI," Joint Collaborative Team on Video Coding, JCTVC-A116 PowerPoint, Apr. 24, 2010, 28 pp.
Yu, W. et al., "Probability Modeling for Encoding Quantized Transform Coefficients," IEEE Picture Coding Symposium, Apr. 24, 2006, 6 pp.
X. Li et al, "Predictive Adaptive Transform Coefficients Scan Ordering for Inter-Frame Coding" Joint Collaborative Team on Video Coding (JCT-VC) of ITU-T SG16 WP3 and ISO/IEC JTC1/SC29/WG11, Document: JCTVC-A020, Apr. 15-23, 2010, 4 pages.
Amonou, I. et al., "Description of video coding technology proposal by France Telecom, NTT, NTT Docomo, Panasonic and Technicolor," ITU-T SG16 WP3 and ISO/IEC JTCI/SC29NVG11, Document JCTVC-A114, Dresden, DE, Apr. 15-23, 2010, 42 pp.
Bross B., et al., "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 259 Pages, 34, 54-55, 74-75, 90-98, 220-224, URL: http://wftp3.itu.int/AV-ARCH/JCTVC-SITE/.
Bross B., et al., "High Efficiency Video Coding (HEVC) Text Specification Draft 7," JCTVC-I1003 d2, 9. JCT-VC Meeting; 100. MPEG Meeting; Apr. 27, 2012-May 7, 2012; Geneva; (Joint Collaborative Team On Video Coding of ISO/IEC JTC1/SC29/WG11 and ITU-T SG.16 ); URL: http://wftp3.1tu.int/av-arch/jctvc-site/, No. JCTVC-I1003, May 10, 2012 (May 10, 2012), XP030112373, 290 pages.
Bross B., et al., "High Efficiency Video Coding (HEVC) Text Specification Draft 8", Jul. 11-20, 2012, 10. JCT-VC Meeting, 101. MPEG Meeting, Stockholm; (Joint Collaborative Team On Video Coding of ISO/IEC JTC1/SC29/WG11 and ITU-T SG.16); URL: http://wftp3.itu.int/av-arch/jctvc-site/,, No. JCTVC-J1003_d7, XP030112947, Jul. 28, 2012 (Jul. 28, 2012), pp. 197-201, section A.4.1 ,A.4.2, 260 Pages.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pages.
Fan X., et al., "A Novel Coefficient Scanning Scheme for Directional Spatial Prediction-Based Image Compression", Proceedings of International Conference on Multimedia and EXPO, 2003, Jul. 6-9, 2003, Piscataway, NJ, vol. 2, pp. 557-560, XP010650616.
HHI: "Proof of Date of Files in TMUC0.9", Jan. 27, 2017, XP055339862, 1 page. Retrived from Internet: URL: https://hevc.hhi.fraunhofer.de/trac/hevc/browser/tags/.
Kim C-S., et al., "Fast Intra-prediction Model Selection for H.264 Codec," Medical Imaging 2002: PACS and Integrated Medical Information Systems: Design and Evaluation, vol. 5241, Nov. 19, 2003 (Nov. 19, 2003), XP055257488, 1000 20th St, Bellingham WA 98225-6705 USA ISSN: 0277-786X, DOI: 10.1117/12 511393 ISBN: 978-1-5106-0167-3 (12 pp).
Sun Q., et al., "An Adaptive Coefficient Scanning Scheme for Inter-Prediction Coding (Abstract)," 26, Picture Coding Symposium; Nov. 7, 2007-Nov. 9, 2007; Lisbon, Nov. 7, 2007 (Nov. 7, 2007), XP030080378 (4 pp).
SZE (TI) V: CE11: Coding efficiency of tools i n HHI Transform—Coding (JCTVC-A116), 95. MPEG Meeting Jan. 24, 2011-Jan. 28, 2011; Daegu; (Motion Picture Expert Group or ISO / IEC JTCI/SC29/WGII), No. m18949, Jan. 21, 2011 (Jan. 21, 2011), XP030047518 (8 pp).
"TComTrQuant Source Code: tags /0.9/source/Lib/TLibCommon /TComTrQuant.cpp", Nov. 1, 2010, XP055339854, 163 pages. Retrieved from the Internet: URL: https://hevc.hhi.fraunhofer.de/trac/hevc/browser/tags/0.9/source/Lib/TLibCommon/TComTrQuant.cpp.
Tu C., et al., "Context-Based Entropy Coding of Block Transform Coeffcients for Image Compression", IEEE Transactions On Image

(56) References Cited

OTHER PUBLICATIONS

Processing, IEE Service Center, Piscataway, NJ, US, vol. 11, No. 11, Nov. 1, 2002 (Jan. 1, 2002), XP011074327, ISSN: 1057-7149 (13 pp).
Wei Y.C., et al., "Intra-mode dependent coding method for image compression", Fifth International Conference onInformation Assurance and Security, IAS '09, Aug. 2009, pp. 371-374.
Xin J., et al., "Fast Mode Decision for Intra-only H.264/AVC Coding," 25, Picture Coding Symposium; Apr. 24, 2006-Apr. 26, 2006; Beijing, Apr. 24, 2006 (Apr. 24, 2006), XP030080257 (5 pp).

* cited by examiner

|   |   | 406 |   |
|---|---|---|---|
| 6 | 2 | 1 | 0 |
| 3 | 3 | 0 | 0 |
| 1 | 0 | 0 | 0 |
| 0 | 0 | 0 | 0 |

FIG. 4A

|   |   | 408 |   |
|---|---|---|---|
| 1 | 1 | 1 | 0 |
| 1 | 1 | 0 | 0 |
| 1 | 0 | 0 | 0 |
| 0 | 0 | 0 | 0 |

FIG. 4B

|   |   | 410 |   |
|---|---|---|---|
| 0 | 0 | 1 | 0 |
| 0 | 0 | 0 | 0 |
| 0 | 0 | 0 | 0 |
| 0 | 0 | 0 | 0 |

FIG. 4C

USING A MOST PROBABLE SCANNING ORDER TO EFFICIENTLY CODE SCANNING ORDER INFORMATION FOR A VIDEO BLOCK IN VIDEO CODING

This application is a continuation of U.S. application Ser. No. 13/332,054, filed Dec. 20, 2011, which claims the benefit of U.S. Provisional Application No. 61/426,431, filed Dec. 22, 2010, U.S. Provisional Application No. 61/426,426, filed Dec. 22, 2010, and U.S. Provisional Application No. 61/547,530, filed Oct. 14, 2011, the entire contents of each of which are incorporated herein by reference.

TECHNICAL FIELD

This disclosure relates to video coding, and more particularly, to the coding of syntax information related to coefficients of a video block.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques for coding coefficients associated with a block of video data during a video coding process, including techniques for coding information that identifies a scanning order associated with the block, i.e., scanning order information for the block. The techniques of this disclosure may improve efficiency for coding of scanning order information for blocks of video data used to code the blocks by coding scanning order information for a particular block using information that identifies a most probable scanning order for the block. In other words, the techniques may improve compression of the scanning order information for the blocks when the information is coded.

In one example, the coding efficiency may be improved by determining a most probable scanning order for a block of video data, and coding an indication of whether the scanning order associated with the block, i.e., the scanning order used to code the block, is the most probable scanning order. In this example, in the event the scanning order associated with the block is the most probable scanning order, no further scanning order information may be coded for the block. In the event the scanning order associated with the block is not the most probable scanning order, however, the techniques may further include coding an indication of the scanning order associated with the block. Because, by definition, a most probable scanning order for a particular block of video data will, on average, be used to code the block more often than any other scanning order that also may be used to code the block, the additional indication of the scanning order associated with the block will not be coded in numerous cases. As a result, the scanning order information for the block may be coded using less information than when using other techniques, e.g., when always coding the scanning order information for the block in its entirety.

As another example, the coding efficiency may be improved by, in the event the scanning order associated with the block is not the most probable scanning order, using a zig-zag scanning order to code the coefficients associated with the block. Once again, because, by definition, a most probable scanning order for a particular block of video data will, on average, be used to code the block more often than any other scanning order that also may be used to code the block, the initial indication of whether the scanning order associated with the block is the most probable scanning order will indicate the scanning order information for the block in its entirety in numerous cases, obviating the need for coding any further scanning order information. Furthermore, in the event the scanning order associated with the block is not the most probable scanning order, not coding an indication of the scanning order associated with the block, but rather using the zig-zag scanning order to code the coefficients associated with the block, may be sufficient to efficiently code the block. For example, any adverse effects of using the zig-zag scanning order to code the coefficients, rather than using another scanning order that may more efficiently scan the coefficients, may be outweighed by the reduced coding of the scanning order information for the block described above.

As still another example, the coding efficiency may be improved by designating the zig-zag scanning order as the most probable scanning order for the block. In this example, because the zig-zag scanning order may, on average, be used to code the block more often than any other scanning order that also may be used to code the block, the additional indication of the scanning order associated with the block may not be coded in numerous cases. Furthermore, by designating the zig-zag scanning order as the most probable scanning order, the coding efficiency may be improved by avoiding determining an actual most probable scanning order for the block, as described above.

In each of the examples described above, the coding efficiency may be further improved by entropy coding the scanning order information for the block, i.e., one or more of the indication of whether the scanning order associated with the block is the most probable scanning order, and the indication of the scanning order associated with the block. For example, the scanning order information may be entropy coded by performing a context adaptive entropy coding process, e.g., a context adaptive binary arithmetic coding (CABAC) process that includes applying a context model based on at least one context. In the examples described above, the at least one context may include one of the most probable scanning order, a prediction mode associated with the block, and a size associated with the block, which may result in probability estimates included within the context model being more accurate relative to probability estimates determined using other techniques. As a result, the scanning order information for the block may be coded more efficiently. For example, the information may be coded using fewer bits than when using other techniques, e.g., when using other, less accurate probability estimates to code the information.

The techniques of this disclosure may, in some examples, be used with any context adaptive entropy coding methodology, including CABAC, probability interval partitioning entropy coding (PIPE), or another context adaptive entropy coding methodology. CABAC is described in this disclosure for purposes of illustration, but without limitation as to the techniques broadly described in this disclosure. Also, the techniques may be applied to coding of other types of data generally, e.g., in addition to video data.

Accordingly, the techniques of this disclosure may enable using more efficient coding methods relative to other methods when coding scanning order information for one or more blocks of video data. In this manner, there may be a relative bit savings for a coded bitstream including the information when using the techniques of this disclosure.

In one example, a method of coding coefficients associated with a block of video data during a video coding process includes coding information that identifies a scanning order associated with the block, including determining a most probable scanning order for the block, and coding an indication of whether the scanning order associated with the block is the most probable scanning order.

In another example, an apparatus for coding coefficients associated with a block of video data during a video coding process includes a video coder configured to code information that identifies a scanning order associated with the block, wherein to code the information that identifies the scanning order associated with the block, the video coder is configured to determine a most probable scanning order for the block, and code an indication of whether the scanning order associated with the block is the most probable scanning order.

In another example, a device for coding coefficients associated with a block of video data during a video coding process includes means for coding information that identifies a scanning order associated with the block, including means for determining a most probable scanning order for the block, and means for coding an indication of whether the scanning order associated with the block is the most probable scanning order.

The techniques described in this disclosure may be implemented in hardware, software, firmware, or combinations thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a tangible computer-readable medium and loaded and executed in the processor.

Accordingly, this disclosure also contemplates a computer-readable medium comprising instructions that, when executed, cause a processor to code coefficients associated with a block of video data during a video coding process, wherein the instructions cause the processor to code information that identifies a scanning order associated with the block, wherein the instructions that cause the processor to code the information that identifies the scanning order associated with the block comprise instructions that cause the processor to determine a most probable scanning order for the block, and code an indication of whether the scanning order associated with the block is the most probable scanning order.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-4C are conceptual diagrams that illustrate an example of a block of video data and corresponding significant coefficient position information and last significant coefficient position information.

DETAILED DESCRIPTION

Figure 1:
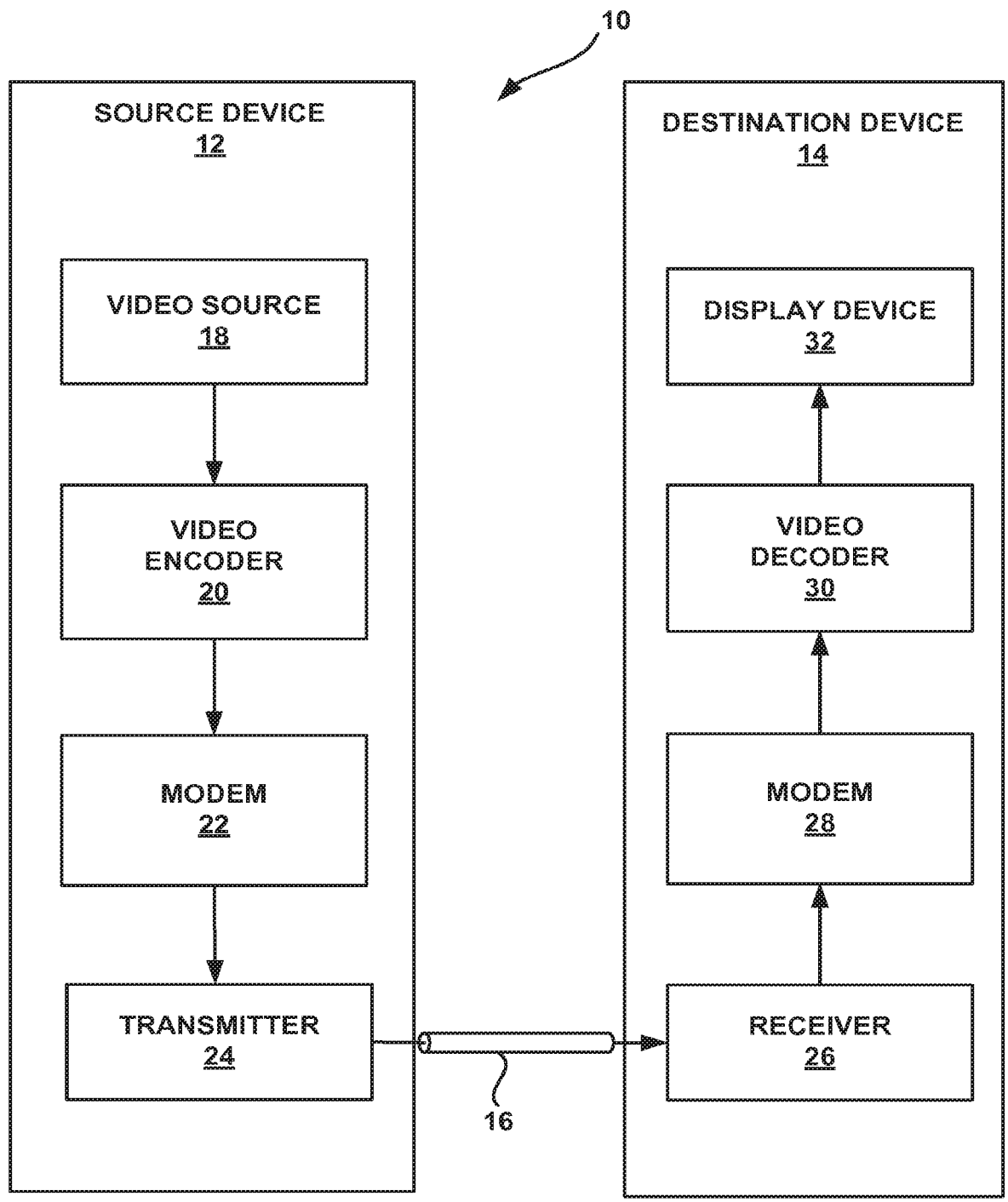
FIG. 1 is a block diagram that illustrates an example of a video encoding and decoding system that may implement techniques for using a most probable scanning order to efficiently code scanning order information for a block of video data, consistent with the techniques of this disclosure.

This disclosure describes techniques for coding coefficients associated with a block of video data during a video coding process, including techniques for coding information that identifies a scanning order associated with the block, i.e., scanning order information for the block. The techniques of this disclosure may improve efficiency for coding of scanning order information for blocks of video data used to code the blocks by coding scanning order information for a particular block using information that identifies a most probable scanning order for the block. In other words, the techniques may improve compression of the scanning order information for the blocks when the scanning order information is coded.

In this disclosure, the term "coding" refers to encoding that occurs at the encoder or decoding that occurs at the decoder. Similarly, the term coder refers to an encoder, a decoder, or a combined encoder/decoder (CODEC). The terms coder, encoder, decoder and CODEC all refer to specific machines designed for the coding (encoding and/or decoding) of video data consistent with this disclosure.

In general, empirical testing performed in development of these techniques has demonstrated a correlation between a prediction mode and a size associated with a block of video data, and a scanning order associated with the block, i.e., the scanning order used to code the block. For example, the scanning order associated with the block may depend on the prediction mode used to generate prediction data for the block, and on the size of the block. In other words, a particular scanning order may be used to code the block more often than any other scanning order that also may be used to code the block, depending on a prediction mode and a size associated with the block.

Coding efficiency for coding of scanning order information for blocks of video data used to code the blocks may be improved by taking advantage of the above-described correlation. Specifically, the coding efficiency may be improved by coding scanning order information for a particular block using information that identifies a most probable scanning order for the block. In some examples, a most probable scanning order for a particular block may be determined based on an intra-prediction mode and a size associated with the block. For example, an encoder and a decoder may both be programmed to define the most probable scanning order for the block based on the intra-prediction mode and the size associated with the block, and information can be signaled by the encoder to indicate to the decoder whether the most probable scanning order was actually used by the encoder to encode the block.

In one example, the coding efficiency may be improved by determining a most probable scanning order for a block of video data, and coding an indication of whether the scanning order associated with the block, i.e., the scanning order used to code the block, is the most probable scanning order. In this example, in the event the scanning order associated with the block is the most probable scanning order, no further scanning order information may be coded for the block. In the event the scanning order associated with the block is not the most probable scanning order, however, the techniques may further include coding an indication of the scanning order associated with the block. Because, by definition, a most probable scanning order for a particular block of video data will, on average, be used to code the block more often than any other scanning order that also may be used to code the block, the additional indication of the scanning order associated with the block will not be coded in numerous cases. As a result, the scanning order information for the block may be coded using less information than when using other techniques, e.g., when always coding the scanning order information for the block in its entirety.

As another example, the coding efficiency may be improved by, in the event the scanning order associated with the block is not the most probable scanning order, using a zig-zag scanning order to code the coefficients associated with the block. Once again, because, by definition, a most probable scanning order for a particular block of video data will, on average, be used to code the block more often than any other scanning order that also may be used to code the block, the initial indication of whether the scanning order associated with the block is the most probable scanning order will indicate the scanning order information for the block in its entirety in numerous cases, obviating the need for coding any further scanning order information. Furthermore, in the event the scanning order associated with the block is not the most probable scanning order, not coding an indication of the scanning order associated with the block, but rather using the zig-zag scanning order to code the coefficients associated with the block, may be sufficient to efficiently code the block. For example, any adverse effects of using the zig-zag scanning order to code the coefficients, rather than using another scanning order that may more efficiently scan the coefficients, may be outweighed by the reduced coding of the scanning order information for the block described above.

As still another example, the coding efficiency may be improved by designating the zig-zag scanning order as the most probable scanning order for the block. In this example, because the zig-zag scanning order may, on average, be used to code the block more often than any other scanning order that also may be used to code the block, the additional indication of the scanning order associated with the block may not be coded in numerous cases. Furthermore, by designating the zig-zag scanning order as the most probable scanning order, the coding efficiency may be improved by avoiding determining an actual most probable scanning order for the block, as described above.

In each of the examples described above, the coding efficiency may be further improved by entropy coding the scanning order information for the block, i.e., one or more of the indication of whether the scanning order associated with the block is the most probable scanning order, and the indication of the scanning order associated with the block. For example, the scanning order information may be entropy coded by performing a context adaptive entropy coding process, e.g., a context adaptive binary arithmetic coding (CABAC) process that includes applying a context model based on at least one context. In the examples described above, the at least one context may include one of the most probable scanning order, a prediction mode associated with the block, and a size associated with the block, which may result in probability estimates included within the context model being more accurate relative to probability estimates determined using other techniques. A result, the scanning order information for the block may be coded more efficiently. For example, the information may be coded using fewer bits than when using other techniques, e.g., when using other, less accurate probability estimates to code the information.

Coding scanning order information for one or more blocks of video data in the manner described above may enable using more efficient coding methods relative to other methods. In this manner, there may be a relative bit savings for a coded bitstream including the information when using the techniques of this disclosure.

The techniques of this disclosure may, in some examples, be used with any context adaptive entropy coding methodology, including CABAC, probability interval partitioning entropy coding (PIPE), or another context adaptive entropy coding methodology. CABAC is described in this disclosure for purposes of illustration, but without limitation as to the techniques broadly described in this disclosure. Also, the techniques may be applied to coding of other types of data generally, e.g., in addition to video data.

FIG. 1 is a block diagram that illustrates an example of a video encoding and decoding system 10 that may implement techniques for using a most probable scanning order to efficiently code scanning order information for a block of video data, consistent with the techniques of this disclosure. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern using a most probable scanning order to efficiently code scanning order information for a block of video data, are not necessarily limited to wireless applications or settings. These techniques may generally apply to any scenario where encoding or decoding is performed, including over-the-air television broadcasts, cable television transmissions, satellite television transmissions, streaming Internet video transmissions, encoded digital video that is encoded onto a storage medium or retrieved and decoded from a storage medium, or other scenarios. Accordingly, communication channel 16 is not required and the techniques of this disclosure may apply to settings where encoding is applied or where decoding is applied, e.g., without any data communication between encoding and decoding devices.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 and/or video decoder 30 of destination device 14 may be configured to apply the techniques for using a most probable scanning order to efficiently code scanning order information for a block of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for using a most probable scanning order to efficiently code scanning order information for a block of video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 includes video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process described above may implement one or more of the techniques described herein to use a most probable scanning order to efficiently code scanning order information for a block of video data. The information communicated over channel 16 may include syntax information defined by video encoder 20, which is also used by video decoder 30, that includes syntax elements that describe characteristics and/or processing of blocks of video data (e.g., macroblocks, or coding units), e.g., scanning order information for the blocks, and other information. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, encoding or decoding devices may implement techniques of this disclosure without any communication between such devices. For example, an encoding device may encode and store an encoded bitstream consistent with the techniques of this disclosure. Alternatively, a decoding device may receive or retrieve an encoded bitstream, and decode the bitstream consistent with the techniques of this disclosure.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2, ITU-T H.263, and the High Efficiency Video Coding (HEVC) standard presently under development. In general, the techniques of this disclosure are described with respect to HEVC, but it should be understood that these techniques may be used in conjunction with other video coding standards as well. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder and decoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. A video encoder, e.g., video encoder 20, typically operates on video blocks within individual video frames in order to encode the video data. According to the ITU-T H.264 standard, a video block may correspond to a macroblock or a partition of a macroblock. According to other standards, e.g., HEVC described in greater detail below, a video block may correspond to a coding unit (e.g., a largest coding unit), or a partition of a coding unit. The video blocks may have fixed or varying sizes, and may differ in size according to a specified coding standard. Each video frame may include a plurality of slices, i.e., portions of the video frame. Each slice may include a plurality of video blocks, which may be arranged into partitions, also referred to as sub-blocks.

Depending on the specified coding standard, video blocks may be partitioned into various "N×N" sub-block sizes, such as 16×16, 8×8, 4×4, 2×2, and so forth. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have sixteen pixels in a vertical direction (y=16) and sixteen pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N. As one example, in the ITU-T H.264 standard, blocks that are 16 by 16 pixels in size may be referred to as macroblocks, and blocks that are less than 16 by 16 pixels may be referred to as partitions of a 16 by 16 macroblock. In other standards, e.g., HEVC, blocks may be defined more generally with respect to their size, for example, as coding units and partitions thereof, each having a varying, rather than a fixed size.

Video blocks may comprise blocks of pixel data in the pixel domain, or blocks of transform coefficients in the transform domain, e.g., following application of a transform, such as a discrete cosine transform (DCT), an integer transform, a wavelet transform, or a conceptually similar transform to residual data for a given video block, wherein the residual data represents pixel differences between video data for the block and predictive data generated for the block. In some cases, video blocks may comprise blocks of quantized transform coefficients in the transform domain, wherein, following application of a transform to residual data for a given video block, the resulting transform coefficients are also quantized.

Block partitioning serves an important purpose in block-based video coding techniques. Using smaller blocks to code video data may result in better prediction of the data for locations of a video frame that include high levels of detail, and may therefore reduce the resulting error (i.e., deviation of the prediction data from source video data), represented as residual data. While potentially reducing the residual data, such techniques may, however, require additional syntax information to indicate how the smaller blocks are partitioned relative to a video frame, and may result in an increased coded video bitrate. Accordingly, in some techniques, block partitioning may depend on balancing the desirable reduction in residual data against the resulting increase in bitrate of the coded video data due to the additional syntax information.

In general, blocks and the various partitions thereof (i.e., sub-blocks) may be considered video blocks. In addition, a slice may be considered to be a plurality of video blocks (e.g., macroblocks, or coding units), and/or sub-blocks (partitions of marcoblocks, or sub-coding units). Each slice may be an independently decodable unit of a video frame. Alternatively, frames themselves may be decodable units, or other portions of a frame may be defined as decodable units. Furthermore, a GOP, also referred to as a sequence, may be defined as a decodable unit.

Efforts are currently in progress to develop a new video coding standard, currently referred to as High Efficiency Video Coding (HEVC). The emerging HEVC standard may also be referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes, e.g., based on the size of a block being intra-prediction coded.

HM refers to a block of video data as a coding unit (CU). A CU may refer to a rectangular image region that serves as a basic unit to which various coding tools are applied for compression. In H.264, it may also be called a macroblock. Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be partitioned, or "split" into sub-CUs.

An LCU may be associated with a quadtree data structure that indicates how the LCU is partitioned. In general, a quadtree data structure includes one node per CU of an LCU, where a root node corresponds to the LCU, and other nodes correspond to sub-CUs of the LCU. If a given CU is split into four sub-CUs, the node in the quadtree corresponding to the split CU includes four child nodes, each of which corresponds to one of the sub-CUs. Each node of the quadtree data structure may provide syntax information for the corresponding CU. For example, a node in the quadtree may include a split flag for the CU, indicating whether the CU corresponding to the node is split into four sub-CUs. Syntax information for a given CU may be defined recursively, and may depend on whether the CU is split into sub-CUs.

A CU that is not split (i.e., a CU corresponding a terminal, or "leaf" node in a given quadtree) may include one or more prediction units (PUs). In general, a PU represents all or a portion of the corresponding CU, and includes data for retrieving a reference sample for the PU for purposes of performing prediction for the CU. For example, when the CU is intra-mode encoded, the PU may include data describing an intra-prediction mode for the PU. As another example, when the CU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the one or more PUs of the CU may also describe, for example, partitioning of the CU into the one or more PUs. Partitioning modes may differ between whether the CU is uncoded, intra-prediction mode encoded, or inter-prediction mode encoded.

A CU having one or more PUs may also include one or more transform units (TUs). Following prediction for a CU using one or more PUs, as described above, a video encoder may calculate one or more residual blocks for the respective portions of the CU corresponding to the one or more PUs. The residual blocks may represent a pixel difference between the video data for the CU and the predicted data for the one or more PUs. A set of residual values may be transformed, scanned, and quantized to define a set of quantized transform coefficients. A TU may define a partition data structure that indicates partition information for the transform coefficients that is substantially similar to the quadtree data structure described above with reference to a CU. A TU is not necessarily limited to the size of a PU. Thus, TUs may be larger or smaller than corresponding PUs for the same CU. In some examples, the maximum size of a TU may correspond to the size of the corresponding CU. In one example, residual samples corresponding to a CU may be subdivided into smaller units using a quadtree structure known as "residual quad tree" (RQT). In this case, the leaf nodes of the RQT may be referred as the TUs, for which the corresponding residual samples may be transformed and quantized.

Following intra-predictive or inter-predictive encoding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data (i.e., quantized transform coefficients) may be performed. The entropy coding may conform to the techniques of this disclosure with respect to using a most probable scanning order to efficiently code scanning order information for a block of video data, and may also use other entropy coding techniques, such as context adaptive variable length coding (CAVLC), CABAC, PIPE, or another entropy coding methodology. For example, coefficient values, represented as magnitudes and corresponding signs (e.g., "+1," or "1") for the quantized transform coefficients may be encoded using the entropy coding techniques.

It should be noted that the prediction, transform, and quantization described above may be performed for any block of video data, e.g., to a PU and/or TU of a CU, or to a macroblock, depending on the specified coding standard. Accordingly, the techniques of this disclosure, relating to using a most probable scanning order to efficiently code scanning order information for a block of video data, may apply to any block of video data, e.g., to any block of quantized transform coefficients, including a macroblock, or a TU of a CU. Furthermore, a block of video data (e.g., a macroblock, or a TU of a CU) may include each of a luminance component (Y), a first chrominance component (U), and a second chrominance component (V) of the corresponding video data. As such, the techniques of this disclosure may be performed for each of the Y, U, and V components of a given block of video data.

In order to encode blocks of video data as described above, information regarding position of significant coefficients within a given block may also be generated and encoded. Subsequently, the values of the significant coefficients may be encoded, as described above. In H.264/AVC and the emerging HEVC standard, when using a context adaptive entropy coding process, e.g., a CABAC process, the position of significant coefficients within a block of video data may be encoded prior to encoding the values of the significant coefficients. The process of encoding the position of all of the significant coefficients within the block may be referred to as significance map (SM) encoding. FIGS. 4A-4C, described in greater detail below, are conceptual diagrams that illustrate an example of a 4×4 block of quantized transform coefficients and corresponding SM data.

A typical SM encoding procedure may be described as follows. For a given block of video data, an SM may be encoded only if there is at least one significant coefficient within the block. Presence of significant coefficients within a given block of video data may be indicated in a coded block pattern (e.g., using syntax element "coded_block_pattern," or CBP), which is a binary value coded for a set of blocks (such as luminance and chrominance blocks) associated with an area of pixels in the video data. Each bit in the CBP is referred to as a coded block flag (e.g., corresponding to syntax element "coded_block_flag") and used to indicate whether there is at least one significant coefficient within its corresponding block. In other words, a coded block flag is a one-bit symbol indicating whether there are any significant coefficients inside a single block of transform coefficients, and a CBP is a set of coded block flags for a set of related video data blocks.

Figure 5A:
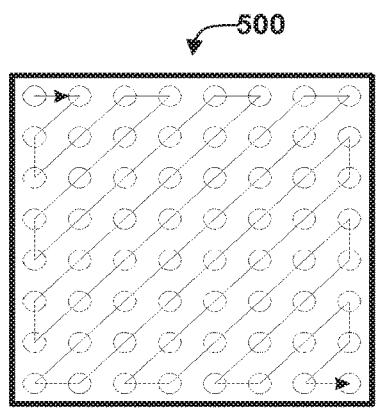
FIGS. 5A-5C are conceptual diagrams that illustrate examples of blocks of video data scanned using a zig-zag scanning order, a horizontal scanning order, and a vertical scanning order.
Figure 5B:
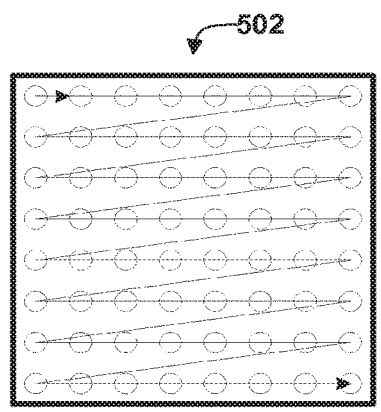
Figure 5C:
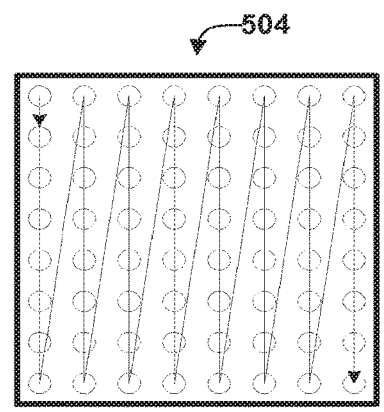

If a coded block flag indicates that no significant coefficients are present within the corresponding block (e.g., the flag equals "0"), no further information may be encoded for the block. However, if a coded block flag indicates that at least one significant coefficient exists within the corresponding block (e.g., the flag equals "1"), an SM may be encoded for the block by following a coefficient scanning order associated with the block. The scanning order may define the order in which the significance of each coefficient within the block is encoded as part of the SM encoding. In other words, scanning may serialize the two-dimensional block of coefficients to a one-dimensional representation to determine the significance of the coefficients. Different scanning orders (e.g., zigzag, horizontal, and vertical) may be used. FIGS. 5A-5C, also described in greater detail below, illustrate examples of some of the various scanning orders that may be used for 8×8 blocks of video data. The techniques of this disclose, however, may also apply with respect to a wide variety of other scanning orders, including a diagonal scanning order, scanning orders that are combinations of zigzag, horizontal, vertical, and/or diagonal scanning orders, as well as scanning orders that are partially zigzag, partially horizontal, partially vertical, and/or partially diagonal. In addition, the techniques of this disclosure may also consider a scanning order that is itself adaptive based on statistics associated with previously coded blocks of video data (e.g., blocks having the same block size or coding mode as the current block being coded). For example, an adaptive scanning order could be the most probable scanning order in some cases.

Given a coded block flag that indicates that at least one significant coefficient exists within a given block, and a scanning order for the block, an SM for the block may be encoded as follows. The two-dimensional block of quantized transform coefficients may first be mapped into a one-dimensional array using the scanning order. For each coefficient in the array, following the scanning order, a one-bit significant coefficient flag (e.g., corresponding to syntax element "significant_coeff_flag") may be encoded. That is, each position in the array may be assigned a binary value, which may be set to "1" if the corresponding coefficient is significant, and set to "0" if it is non-significant (i.e., zero).

If a given significant coefficient flag equals "1," indicating that the corresponding coefficient is significant, an additional one-bit last significant coefficient flag (e.g., corresponding to syntax element "last_significant_coeff_flag") may also be encoded, which may indicate whether the corresponding coefficient is the last significant coefficient within the array (i.e., within the block given the scanning order). Specifically, each last significant coefficient flag may be set to "1" if the corresponding coefficient is the last significant coefficient within the array, and set to "0" otherwise. If the last array position is reached in this manner, and the SM encoding process was not terminated by a last significant coefficient flag equal to "1," then the last coefficient in the array (and thereby the block given the scanning order) may be inferred to be significant, and no last significant coefficient flag may be encoded for the last array position.

FIGS. 4B-4C are conceptual diagrams that illustrate examples of sets of significant coefficient flags and last significant coefficient flags, respectively, corresponding to SM data for the block depicted in FIG. 4A, presented in map, rather than array form. It should be noted that significant coefficient flags and last significant coefficient flags, as described above, may be set to different values (e.g., a significant coefficient flag may be set to "0" if the corresponding coefficient is significant, and "1" if it is non-significant, and a last significant coefficient flag may be set to "0" if the corresponding coefficient is the last significant coefficient, and "1" if it is not the last significant coefficient) in other examples.

After the SM is encoded, as described above, the value of each significant coefficient (i.e., each significant coefficient's magnitude and sign, e.g., indicated by syntax elements "coeff_abs_level_minus1" and "coeff_sign_flag," respectively) in the block may also be encoded.

According to some techniques, a fixed scanning order may be used to code blocks of video data, as described above, e.g., the zig-zag scanning order. According to other techniques, multiple scanning orders may be used to code the blocks. In some examples, "adaptive coefficient scanning" (ACS) may be used, wherein the scanning order adapts over time, and the currently adapted scanning order is used to code a particular block of coefficients at any given time. In still other techniques, video encoder 20 may test several scanning orders based on one or more compression efficiency metrics and select the best scanning order to encode the blocks. Additionally, video encoder 20 may indicate the scanning order to video decoder 30 by encoding an ACS index, which may represent any one of the several scanning orders (e.g., using indices 0 for zig-zag, 1 for horizontal, and 2 for vertical scanning orders).

According to some techniques, video encoder 20 may encode the ACS index only when the last significant coefficient is not located in the first position in the scanning order (corresponding to the top-left position within the block commonly referred to as the "DC" position). Video encoder 20 may encode the ACS index in this manner because video decoder 30 does not need an indication of the scanning order used by video encoder 20 in the case the last (and only) significant coefficient within the block is located in the DC position, since all possible scanning orders may start with the DC position, as shown in FIG. 5, also described in greater detail below.

In the event the last significant coefficient within the block is not located in the DC position, video encoder 20 may encode the ACS index in the following manner. Video encoder 20 may encode a first signal (e.g., "bin1") that indicates whether the scanning order is the zig-zag scanning order (e.g., bin1="0") or not (e.g., bin1="1"). In the event the scanning order is not the zig-zag scanning order, video encoder 20 may encode a second signal (e.g., "bin2") that indicates whether the scanning order is the horizontal scanning order (e.g., bin2="0") or the vertical scanning order (e.g., bin2="1"). Similarly, video decoder 30 may receive and decode the first signal and the second signal to determine the ACS index. Accordingly, rather than always coding the ACS index, video encoder 20 and/or video decoder 30 may code the ACS index only when the last significant coefficient is not located in the DC position.

One drawback of the techniques described above is that, when coding scanning order information for a block of video data, video encoder 20 and/or video decoder 30 may always code the information in its entirety. In other words, video encoder 20 and/or video decoder 30 may always code the entire scanning order information for the block, for example, using one to two bits, or "bins," depending on the scanning order associated with the block, i.e., the scanning order used to code the block. Furthermore, when video encoder 20 and/or video decoder 30 code the scanning order information for the block, the techniques described above fail to take advantage of a correlation among a prediction mode and a size associated with the block, and a scanning order associated with the block, i.e., the scanning order used to code the block. In these cases, always coding the scanning order information for the block in its entirety, and coding the information without taking advantage of the above-described correlation, may result in coding the information less efficiently, e.g., using more bins, than when using other techniques to code the information.

Another drawback of the techniques described above is that, when video encoder 20 and/or video decoder 30 further entropy code the scanning order information for the block, e.g., represented using one to two bins, by performing a context adaptive entropy coding process (e.g., a CABAC process), the techniques may use context models that contain probability estimates that are less accurate than probability estimates determined using other methods. Entropy coding the scanning order information for the block using such probability estimates may once again result in coding the information less efficiently, for example, using more bits, than when using other techniques, e.g., using more accurate probability estimates to entropy code the information.

Accordingly, this disclosure describes techniques that may enable coding scanning order information for a block of video data more efficiently relative to other techniques. As one example, the scanning order information may be coded more efficiently by determining a most probable scanning order for the block, and coding an indication of whether the scanning order associated with the block, i.e., the scanning order used to code the block, is the most probable scanning order. In the event the scanning order associated with the block is the most probable scanning order, no further scanning order information may be coded for the block. In the event the scanning order associated with the block is not the most probable scanning order, however, the techniques may further include coding an indication of the scanning order associated with the block. Because, by definition, a most probable scanning order for a particular block of video data will, on average, be used to code the block more often than any other scanning order that also may be used to code the block, the additional indication of the scanning order associated with the block will not be coded in numerous cases. As a result, the scanning order information for the block may be coded using less information than when using other techniques.

As another example, the scanning order information may be coded more efficiently by, in the event the scanning order associated with the block is not the most probable scanning order, using a zig-zag scanning order to code the coefficients associated with the block. Once again, because, by definition, a most probable scanning order for a particular block of video data will, on average, be used to code the block more often than any other scanning order that also may be used to code the block, the initial indication of whether the scanning order associated with the block is the most probable scanning order will indicate the scanning order information for the block in its entirety in numerous cases, obviating the need for coding any further scanning order information. Furthermore, in the event the scanning order associated with the block is not the most probable scanning order, not coding an indication of the scanning order associated with the block, but rather using the zig-zag scanning order to code the coefficients associated with the block, may be sufficient to efficiently code the block. For example, any adverse effects of using the zig-zag scanning order to code the coefficients, rather than using another scanning order that may more efficiently scan the coefficients, may be outweighed by the reduced coding of the scanning order information for the block described above.

As still another example, the scanning order information may be coded more efficiently by designating the zig-zag scanning order as the most probable scanning order for the block. In this example, because the zig-zag scanning order may, on average, be used to code the block more often than any other scanning order that also may be used to code the block, the additional indication of the scanning order associated with the block may not be coded in numerous cases. Furthermore, by designating the zig-zag scanning order as the most probable scanning order, the coding efficiency may be improved by avoiding determining an actual most probable scanning order for the block, as described above.

In each of the examples described above, the scanning order information may be coded more efficiently by further entropy coding the scanning order information for the block, i.e., one or more of the indication of whether the scanning order associated with the block is the most probable scanning order, and the indication of the scanning order associated with the block. For example, the scanning order information may be entropy coded by performing a context adaptive entropy coding process (e.g., a CABAC process) that includes applying a context model based on at least one context. In the examples described above, the at least one context may include one of the most probable scanning order, a prediction mode associated with the block, and a size associated with the block, which may result in probability estimates included within the context model being more accurate relative to probability estimates determined using other techniques. A result, the scanning order information for the block may be coded more efficiently. For example, the information may be coded using fewer bits than when using other techniques, e.g., when using other, less accurate probability estimates to code the information.

In the examples described above, the most probable scanning order may be defined at the encoder and the decoder based on a coding mode used to code the block and a size associated with the block. The coding mode may be one of an intra-prediction mode and an inter-prediction mode, although these techniques may be most applicable to blocks coded using intra-prediction modes. Thus, in some examples the determination of the most probable scanning order may be based on which of a plurality of intra-prediction modes is used to code the block. The size associated with the block may refer to a CU size, a PU size, a TU size, or possibly even some combination of CU, PU and/or TU sizes associated with the block.

It should be noted that the techniques of this disclosure are applicable to any method of coding scanning order information for a block of video data, including the techniques for SM coding described above, as well as other techniques for coding the scanning order information. For example, the techniques of this disclosure may include coding scanning order information for a block of video data in the manner described herein independently of the SM data (i.e., last significant coefficient position information and the significant coefficient position information) for the block. As one example, the techniques may include coding the scanning order information after coding the last significant coefficient position information, and prior to coding the significant coefficient position information, for the block.

In some examples, video encoder 20 of source device 12 may be configured to encode certain blocks of video data (e.g., one or more macroblocks, or TUs of a CU), and video decoder 30 of destination device 14 may be configured to receive the encoded video data from video encoder 20, e.g., from modem 28 and receiver 26. In accordance with the techniques of this disclosure, as one example, video encoder 20 and/or video decoder 30 may be configured to code information that identifies a scanning order associated with the block, i.e., the scanning order information for the block. For example, video encoder 20 and/or video decoder 30 may be configured to determine a most probable scanning order for the block, and code an indication of whether the scanning order associated with the block is the most probable scanning order. In this example, each of the scanning order associated with the block and the most probable scanning order may comprise one of a zig-zag scanning order, a horizontal scanning order, and a vertical scanning order. Again, the zig-zag, horizontal, and vertical scanning orders are merely examples, and other scanning orders may also be defined or used consistent with the techniques of this disclosure.

To determine the most probable scanning order for the block, video encoder 20 and/or video decoder 30 may be configured to determine a most probable scanning order for the block based on a prediction mode and a size associated with the block, as described in greater detail below with reference to FIGS. 6A-6B.

Furthermore, to code the indication of whether the scanning order associated with the block is the most probable scanning order, video encoder 20 and/or video decoder 30 may be configured to perform a context adaptive entropy coding process (e.g., a CABAC process) that includes applying a context model based on at least one context. For example, the at least one context may include one of the most probable scanning order, a prediction mode associated with the block, and a size associated with the block.

In another example, to code the scanning order information for the block, video encoder 20 and/or video decoder 30 may be further configured to, in the event the scanning order associated with the block is not the most probable scanning order, code an indication of the scanning order associated with the block.

In this example, to code the indication of the scanning order associated with the block, video encoder 20 and/or video decoder 30 may once again be configured to perform a context adaptive entropy coding process (e.g., a CABAC process) that includes video encoder 20 and/or video decoder 30 applying a context model based on at least one context. For example, the at least one context may once again include one of the most probable scanning order, the prediction mode associated with the block, and the size associated with the block.

Accordingly, in this example, video encoder 20 and/or video decoder 30 may be configured to code the scanning order information for the block by coding the indication of whether the scanning order associated with the block is the most probable scanning order, and, in some cases, the indication of the scanning order associated with the block.

In another example, to code the scanning order information for the block, video encoder 20 and/or video decoder 30 may be further configured to, in the event the scanning order associated with the block is not the most probable scanning order, use a zig-zag scanning order to code the coefficients associated with the block. Accordingly, in this example, after determining the most probable scanning order for the block, and coding the indication of whether the scanning order associated with the block is the most probable scanning order, video encoder 20 and/or video decoder 30 may be configured to not code any additional scanning order information for the block.

In still another example, to determine the most probable scanning order for the block, video encoder 20 and/or video decoder 30 may be configured to designate a zig-zag scanning order as the most probable scanning order for the block. In this example, in a similar manner as described above, to code the scanning order information for the block, video encoder 20 and/or video decoder 30 may be further configured to, in the event the scanning order associated with the block is not the most probable scanning order (i.e., in this particular example, the zig-zag scanning order), code an indication of the scanning order associated with the block. In other words, in this example, video encoder 20 and/or video decoder 30 may be configured to presume the zig-zag scanning order to be the most probable scanning order for the block, rather than perform an actual determination of the most probable scanning order for the block, e.g., using scanning order information for previously coded blocks.

In this example, to code the indication of the scanning order associated with the block, video encoder 20 and/or video decoder 30 may once again be configured to perform a context adaptive entropy coding process (e.g., a CABAC process) that includes video encoder 20 and/or video decoder 30 applying a context model based on at least one context. For example, the at least one context may once again include one of the most probable scanning order, the prediction mode associated with the block, and the size associated with the block.

Accordingly, in this example, video encoder 20 and/or video decoder 30 may be configured to code the scanning order information for the block by coding the indication of whether the scanning order associated with the block is the zig-zag scanning order, and, in some cases, the indication of the scanning order associated with the block.

In this example, video encoder 20 and/or video decoder 30 may be further configured to code information that identifies a position of a last non-zero coefficient within the block according to the scanning order associated with the block, i.e., the last significant coefficient position information for the block. Additionally, video encoder 20 and/or video decoder 30 may be further configured to code information that identifies positions of all other non-zero coefficients within the block, i.e., significant coefficient position information for the block. As previously described, the last significant coefficient position information and the significant coefficient position information for the block may be collectively referred to as SM data for the block.

In any case, after coding the scanning order information, and the last significant coefficient position information and the significant coefficient position information, i.e., the SM data, for the block in the manner described above, video encoder 20 and/or video decoder 30 may also code the value of each significant coefficient (e.g., each significant coefficient's magnitude and sign, indicated by syntax elements "coeff_abs_level_minus1" and "coeff_sign_flag," respectively) within the block.

Accordingly, the techniques of this disclosure may enable video encoder 20 and/or video decoder 30 to code the scanning order information for the block more efficiently than when using other methods. In this manner, there may be a relative bit savings for a coded bitstream including the scanning order information when using the techniques of this disclosure.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
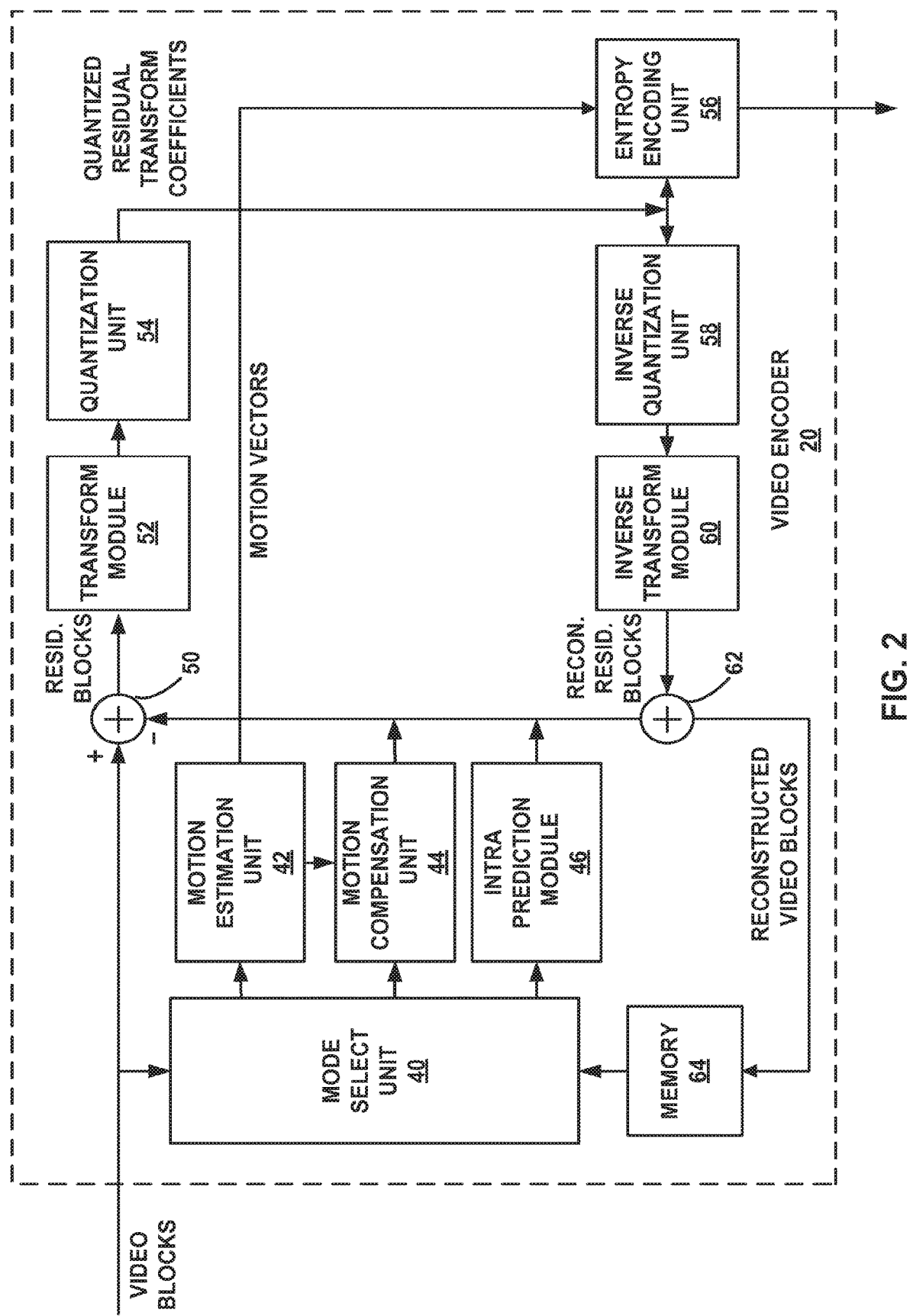
FIG. 2 is a block diagram that illustrates an example of a video encoder that may implement techniques for using a most probable scanning order to efficiently encode scanning order information for a block of video data, consistent with the techniques of this disclosure.

FIG. 2 is a block diagram that illustrates an example of a video encoder 20 that may implement techniques for using a most probable scanning order to efficiently encode scanning order information for a block of video data, consistent with the techniques of this disclosure. Video encoder 20 may perform intra- and inter-coding of blocks within video frames, including macroblocks, CUs, and partitions or sub-partitions thereof. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes, and inter-modes, such as uni-directional prediction (P-mode) or bi-directional prediction (B-mode), may refer to any of several temporal-based compression modes.

As shown in FIG. 2, video encoder 20 receives a current block of video data within a video frame to be encoded. In the example of FIG. 2, video encoder 20 includes motion compensation unit 44, motion estimation unit 42, memory 64, summer 50, transform module 52, quantization unit 54, and entropy encoding unit 56. For video block reconstruction, video encoder 20 also includes inverse quantization unit 58, inverse transform module 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 may perform inter-predictive coding of a given received video block relative to one or more blocks in one or more reference frames to provide temporal compression. Intra-prediction module 46 may perform intra-predictive coding of a given received video block relative to one or more neighboring blocks in the same frame or slice as the block to be coded to provide spatial compression.

Mode select unit 40 may select one of the coding modes, i.e., one mode or multiple intra- or inter-coding modes, based on coding results (e.g., resulting coding rate and level of distortion), and based on a frame or slice type for the frame or slice including the given received block being coded, and provide the resulting intra- or inter-coded block to summer 50 to generate residual block data and to summer 62 to reconstruct the encoded block for use in a reference frame or reference slice. In general, intra-prediction involves predicting a current block relative to neighboring, previously coded blocks, while inter-prediction involves motion estimation and motion compensation to temporally predict the current block.

Motion estimation unit 42 and motion compensation unit 44 represent the inter-prediction elements of video encoder 20. Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a block. Motion compensation may involve fetching or generating the predictive block based on the motion vector determined by motion estimation. Again, motion estimation unit 42 and motion compensation unit 44 may be functionally integrated, in some examples.

Motion estimation unit 42 may calculate a motion vector for a video block of an inter-coded frame by comparing the video block to video blocks of a reference frame in memory 64. Motion compensation unit 44 may also interpolate sub-integer pixels of the reference frame, e.g., an I-frame or a P-frame, for the purposes of this comparison. The ITU H.264 standard, as an example, describes two lists: list 0, which includes reference frames having a display order earlier than a current frame being encoded, and list 1, which includes reference frames having a display order later than the current frame being encoded. Therefore, data stored in memory 64 may be organized according to these lists.

Motion estimation unit 42 may compare blocks of one or more reference frames from memory 64 to a block to be encoded of a current frame, e.g., a P-frame or a B-frame. When the reference frames in memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in memory 64 if no values for sub-integer pixel positions are stored in memory 64. Motion estimation unit 42 may send the calculated motion vector to entropy encoding unit 56 and motion compensation unit 44. The reference frame block identified by a motion vector may be referred to as an inter-predictive block, or, more generally, a predictive block. Motion compensation unit 44 may calculate prediction data based on the predictive block.

Intra-prediction module 46 may intra-predict a current block, as an alternative to the inter-prediction performed by motion estimation unit 42 and motion compensation unit 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select unit 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

After predicting a current block, e.g., using intra-prediction or inter-prediction, video encoder 20 may form a residual video block by subtracting the prediction data calculated by motion compensation unit 44 or intra-prediction module 46 from the original video block being coded. Summer 50 represents the component or components that may perform this subtraction operation. Transform module 52 may apply a transform, such as a discrete cosine transform (DCT) or a conceptually similar transform, to the residual block, producing a video block comprising residual transform coefficient values. Transform module 52 may perform other transforms, such as those defined by the H.264 standard, which are conceptually similar to DCT. Wavelet transforms, integer transforms, sub-band transforms or other types of transforms could also be used. In any case, transform module 52 may apply the transform to the residual block, producing a block of residual transform coefficients. The transform may convert the residual information from a pixel domain to a transform domain, such as a frequency domain. Quantization unit 54 may quantize the residual transform coefficients to further reduce bit rate. The quantization process may reduce the bit depth associated with some or all of the coefficients. The degree of quantization may be modified by adjusting a quantization parameter.

Following quantization, entropy encoding unit 56 may entropy encode the quantized transform coefficients, which may include CAVLC, CABAC, PIPE, or another entropy coding technique. Following the entropy coding by entropy encoding unit 56, the encoded video may be transmitted to another device or archived for later transmission or retrieval.

In some cases, entropy encoding unit 56 or another unit of video encoder 20 may be configured to perform other coding functions, in addition to entropy coding quantized transform coefficients as described above. For example, entropy encoding unit 56 may construct header information for the block (e.g., macroblock, CU, or LCU), or video frame containing the block, with appropriate syntax elements for transmission in the encoded video bitstream. According to some coding standards, such syntax elements may include scanning order information for the block, as previously described. As also previously described, the scanning order information may consume a high percentage of the overall compressed video bitrate if coded inefficiently. As such, this disclosure describes techniques that may enable coding the scanning order information for the block more efficiently than when using other methods.

In some examples, entropy encoding unit 56 of video encoder 20 may be configured to encode certain blocks of video data (e.g., one or more macroblocks, or TUs of a CU). In accordance with the techniques of this disclosure, as one example, entropy encoding unit 56 may be configured to encode information that identifies a scanning order associated with the block, i.e., scanning order information for the block. For example, entropy encoding unit 56 may be configured to determine a most probable scanning order for the block, and encode an indication of whether the scanning order associated with the block is the most probable scanning order. In this example, each of the scanning order associated with the block and the most probable scanning order may comprise one of a zig-zag scanning order, a horizontal scanning order, and a vertical scanning order. Again, the zig-zag, horizontal, and vertical scanning orders are merely examples, and other scanning orders may also be defined or used consistent with the techniques of this disclosure.

To determine the most probable scanning order for the block, entropy encoding unit 56 may be configured to determine a most probable scanning order for the block based on a prediction mode and a size associated with the block, as described in greater detail below with reference to FIGS. 6A-6B. For example, entropy encoding unit 56 may determine the most probable scanning order using scanning order information for previously encoded blocks, e.g., blocks with a same associated prediction mode and size as the currently encoded block.

Furthermore, to encode the indication of whether the scanning order associated with the block is the most probable scanning order, entropy encoding unit 56 may be configured to perform a context adaptive entropy coding process (e.g., a CABAC process) that includes applying a context model based on at least one context. For example, the at least one context may include one of the most probable scanning order, a prediction mode associated with the block, and a size associated with the block.

Additionally, the indication may comprise a single bit, or "bin." For example, entropy encoding unit 56 may encode the bin to indicate whether the scanning order is the most probable scanning order (e.g., bin="0") or otherwise (e.g., bin="1").

In another example, to encode the scanning order information for the block, entropy encoding unit 56 may be further configured to, in the event the scanning order associated with the block is not the most probable scanning order, encode an indication of the scanning order associated with the block.

In this example, to encode the indication of the scanning order associated with the block, entropy encoding unit 56 may be configured to perform a context adaptive entropy coding process (e.g., a CABAC process) that includes entropy encoding unit 56 applying a context model based on at least one context. For example, the at least one context may include one of the most probable scanning order, the prediction mode associated with the block, and the size associated with the block.

Furthermore, the indication of the scanning order associated with the block may also comprise a single bin. For example, entropy encoding unit 56 may be configured to encode the bin to indicate whether the scanning order is a first scanning order (e.g., bin="0") or a second scanning order (e.g., bin="1"). In this example, the first and second scanning orders may comprise scanning orders, other than the most probable scanning order, that are also used to code blocks of video data within the corresponding coding system 10 comprising video encoder 20 and video decoder 30. It should be noted that, in other examples, the scanning order associated with the block may comprise one of a greater number (e.g., 3, 4, 5, ... etc.) of scanning orders, other than the most probable scanning order, that are also used to code blocks of video data within system 10. As such, in other examples, entropy encoding unit 56 may be configured to encode the indication of the scanning order associated with the block using other techniques, e.g., using multiple bins.

Accordingly, in this example, entropy encoding unit 56 may be configured to encode the scanning order information for the block by encoding the indication of whether the scanning order associated with the block is the most probable scanning order, and, in some cases, the indication of the scanning order associated with the block.

The following is one example of computer code that may be used to perform the techniques of this disclosure, consistent with the example described above. For example, the computer code includes an algorithm for configuring a two-dimensional array of scanning order indices that correspond to most probable scanning orders for blocks of video data. In this example, the most probable scanning order for a particular block is determined based on an intra-prediction mode and a size associated with the block. Accordingly, each row of the two-dimensional array corresponds to a size associated with a block of video data, and each column of the array corresponds to an intra-prediction mode associated with the block. In other words, each position within the two-dimensional array indicates a most probable scanning order for a block of video data being associated with a particular intra-prediction mode and size. For example, the most probable scanning orders for the blocks indicated by the two-dimensional array may be determined using scanning order information corresponding to previously encoded blocks.

In this example, the most probable scanning order for a particular block is indicated using one of three scanning order indices, i.e., "0," "1," and "2." As one example, the scanning order indices may each represent one of a zig-zag scanning order, a horizontal scanning order, and a vertical scanning order. In other examples, the scanning order indices may represent other scanning orders, and may comprise more or fewer indices.

The computer code also includes an encoding algorithm that uses a most probable scanning order for a particular block (determined based on an intra-prediction mode and a size associated with the block using the two-dimensional array described above) to encode scanning order information for the block. For example, the algorithm encodes the scanning order information for the block using between one and two bins, wherein each bin is encoded by performing a context adaptive entropy coding process (e.g., a CABAC process) that includes applying a context model based on contexts, including the most probable scanning order, the intra-prediction mode, and the size. As previously described, the contexts are used to select probability estimates within the context model for encoding a particular bin. Specifically, the probability estimates indicate a likelihood of the bin having a given value (e.g., "0" or "1").

```
const UChar mostProbableScan[4][34] =
{{1, 2, 0, 0, 0, 1, 0, 2, 2, 0, 0, 1, 1, 0, 2, 2, 2, 2, 0, 1, 1, 1, 1, 1, 0, 0, 2,
2, 2, 2, 2, 2, 2, 2},
{1, 2, 0, 0, 0, 0, 0, 2, 2, 0, 0, 0, 0, 0, 2, 2, 0, 0, 0, 0, 1, 1, 0, 0, 0, 0, 0,
2, 2, 2, 2, 2, 0},
{1, 2, 0, 0, 0, 0, 0, 0, 0, 0, 0, 0, 0, 0, 2, 2, 0, 0, 0, 0, 1, 0, 0, 0, 0, 0, 0,
0, 2, 2, 0, 0, 0},
{1, 2, 0, 0, 0, 0, 0, 0, 0, 0, 0, 0, 0, 0, 0, 0, 0, 0, 0, 0, 1, 0, 0, 0, 0, 0, 0,
```

-continued

```
0, 2, 0, 0, 0, 0}};
if ( scanIdx == mostProbableScan)
    {encodeBin( 1, context( blockSize, mostProbableScan) );}
else
    {encodeBin( 0, context( blockSize, mostProbableScan) );
    encodeBin( scanIdx > mostProbableScan ? scanIdx-1:scanIdx,
    context(
    blockSize, mostProbableScan+3));}
```

In another example, to encode the scanning order information for the block, entropy encoding unit 56 may be further configured to, in the event the scanning order associated with the block is not the most probable scanning order, use a zig-zag scanning order to encode the coefficients associated with the block. Accordingly, in this example, after determining the most probable scanning order for the block, and encoding the indication of whether the scanning order associated with the block is the most probable scanning order, entropy encoding unit 56 may be configured to not encode any additional scanning order information for the block.

In still another example, to determine the most probable scanning order for the block, entropy encoding unit 56 may be configured to designate a zig-zag scanning order as the most probable scanning order for the block. In this example, in a similar manner as described above, to encode the scanning order information for the block, entropy encoding unit 56 may be further configured to, in the event the scanning order associated with the block is not the most probable scanning order (i.e., in this particular example, the zig-zag scanning order), encode an indication of the scanning order associated with the block. In other words, in this example, entropy encoding unit 56 may be configured to presume the zig-zag scanning order to be the most probable scanning order for the block, rather than perform an actual determination of the most probable scanning order for the block, e.g., using scanning order information for previously encoded blocks.

In this example, to encode the indication of the scanning order associated with the block, entropy encoding unit 56 may be configured to perform a context adaptive entropy coding process (e.g., a CABAC process) that includes entropy encoding unit 56 applying a context model based on at least one context. For example, the at least one context may include one of the most probable scanning order, the prediction mode associated with the block, and the size associated with the block.

The indication of the scanning order associated with the block may once again comprise a single bin. For example, entropy encoding unit 56 may encode the bin to indicate whether the scanning order is a first scanning order (e.g., bin="0") or a second scanning order (e.g., bin="1"). In this example, the first and second scanning orders may comprise scanning orders, other than the most probable scanning order (i.e., in this particular example, the zig-zag scanning order), that are also used to code blocks of video data within system 10. It should be noted that, in other examples, the scanning order associated with the block may comprise one of a greater number (e.g., 3, 4, 5, ... etc.) of scanning orders, other than the most probable scanning order (i.e., in this particular example, the zig-zag scanning order), that are also used to code blocks of video data within system 10. As such, in other examples, entropy encoding unit 56 may encode the indication of the scanning order associated with the block using other techniques, e.g., using multiple bins.

Accordingly, in this example, entropy encoding unit 56 may be configured to encode the scanning order information for the block by encoding the indication of whether the scanning order associated with the block is the most probable scanning order, (i.e., in this particular example, the zig-zag scanning order), and, in some cases, the indication of the scanning order associated with the block.

The following is another example of computer code used to perform the techniques of this disclosure, consistent with the example described above. For example, the computer code includes an algorithm for configuring a two-dimensional array of context indices for blocks of video data. In this example, each context index for a particular block is determined based on an intra-prediction mode and a size associated with the block. Accordingly, each row of the two-dimensional array corresponds to a size associated with a block of video data, and each column of the array corresponds to an intra-prediction mode associated with the block. In other words, each position within the two-dimensional array includes a context index for a block of video data being associated with a particular intra-prediction mode and size.

In this example, each context index for a particular block comprises one of three indices, i.e., "0," "1," and "2." In other examples, the context indices may comprise more or fewer indices.

The computer code also includes an encoding algorithm that uses a context index for a particular block (determined based on an intra-prediction mode and a size associated with the block using the two-dimensional array described above) to encode scanning order information for the block. For example, the algorithm encodes the scanning order information for the block using between one and two bins, wherein each bin is encoded by performing a context adaptive entropy coding process (e.g., a CABAC process) that includes applying a context model based on contexts, including the context index, the intra-prediction mode, and the size. As previously described, the contexts are used to select probability estimates within the context model for encoding a particular bin. Specifically, the probability estimates indicate a likelihood of the bin having a given value (e.g., "0" or "1").

```
const UChar scanContext [7][34] =
{
{0, 0, 0, 0, 0, 0, 0, 0, 0, 0, 0, 0, 0, 0, 0, 0, 0, 0, 0, 0, 0, 0, 0, 0, 0, 0,
0, 0, 0, 0, 0, 0, },
{0, 0, 0, 0, 0, 0, 0, 0, 0, 0, 0, 0, 0, 0, 0, 0, 0, 0, 0, 0, 0, 0, 0, 0, 0, 0,
0, 0, 0, 0, 0, 0, },
{1, 2, 0, 0, 0, 0, 0, 0, 0, 0, 0, 0, 0, 0, 0, 0, 0, 0, 0, 0, 1, 0, 0, 0, 0, 0,
0, 2, 0, 0, 0, 0, },
{1, 2, 0, 0, 0, 0, 0, 0, 0, 0, 0, 0, 0, 0, 2, 2, 0, 0, 0, 0, 1, 0, 0, 0, 0, 0,
0, 2, 2, 0, 0, 0, },
{1, 2, 0, 0, 0, 0, 0, 2, 2, 0, 0, 0, 0, 0, 2, 2, 0, 0, 0, 0, 1, 1, 0, 0, 0, 0,
2, 2, 2, 2, 2, 0, },
{1, 2, 0, 0, 0, 1, 0, 2, 2, 0, 0, 1, 1, 0, 2, 2, 2, 2, 0, 1, 1, 1, 1, 1, 0, 0, 2, 2,
2, 2, 2, 2, 2, 2, },
{0, 0, 0, 0, 0, 0, 0, 0, 0, 0, 0, 0, 0, 0, 0, 0, 0, 0, 0, 0, 0, 0, 0, 0, 0, 0,
0, 0, 0, 0, 0, 0, }
};
if ( scanIdx == 0)
    {encodeBin( 0, context( blockSize, scanContext) ); }
else
    {encodeBin( 1, context( blockSize, scanContext) );
    encodeBin(scanIdx > 1 ? 0:1, context( blockSize, scanContext+3));}
```

To encode each bin (i.e., each bin used to represent the indication of whether the scanning order associated with the block is the most probable scanning order and the indication of the scanning order associated with the block) using the context adaptive entropy coding process described above, the corresponding context model may include probability estimates that indicate a probability of the bin comprising a given value (e.g., "0" or "1"). Entropy encoding unit 56 may use the probability estimates for the bin to encode the bin by performing the context adaptive entropy coding process. In some examples, entropy encoding unit 56 may determine the probability estimates using values of corresponding bins for previously encoded blocks of video data, e.g., blocks with a same associated prediction mode and size as the currently encoded block. In other examples, entropy encoding unit 56 also may update the probability estimates using the value of the bin to reflect the probability of the bin comprising a given value. For example, entropy encoding unit 56 may use the updated probability estimates to encode scanning order information for subsequently encoded blocks of video data in the manner described above.

In this example, entropy encoding unit 56 may be further configured to encode information that identifies a position of a last significant coefficient within the block according to the scanning order associated with the block, i.e., the last significant coefficient position information for the block. For example, the last significant coefficient position information for the block may be represented using a sequence of last significant coefficient flags, as previously described. Additionally, entropy encoding unit 56 may be further configured to encode information that identifies positions of all other significant coefficients within the block, i.e., the significant coefficient position information for the block. For example, the significant coefficient position information for the block also may be represented using a sequence of significant coefficient flags, as previously described. As also previously described, entropy encoding unit 56 may encode the last significant coefficient position information and the significant coefficient position information by encoding each flag of the respective sequence by performing a context adaptive entropy coding process (e.g., a CABAC process) that includes applying a context model based on a context. For example, the context may include a position of the flag within the block according to the scanning order associated with block.

In these examples, the context model may include probability estimates that indicate a probability of each flag comprising a given value (e.g., "0" or "1"). In some examples, entropy encoding unit 56 may determine the probability estimates using values of corresponding last significant coefficient flags and significant coefficient flags for previously encoded blocks of video data. In other examples, entropy encoding unit 56 also may update the probability estimates using the value of each flag to reflect the probability of the flag comprising a given value. For example, entropy encoding unit 56 may use the updated probability estimates to encode last significant coefficient position information and significant coefficient position information for subsequently encoded blocks of video data in the manner described above. It should be noted that, in other examples, entropy encoding unit 56 may encode the last significant coefficient position information and the significant coefficient position information for the block using other techniques.

In any case, after encoding the scanning order information, and the last significant coefficient position information and the significant coefficient position information, i.e., the SM data, for the block in the manner described above, entropy encoding unit 56 may also encode the value of each significant coefficient (e.g., each significant coefficient's magnitude and sign, indicated by syntax elements "coeff_abs_level_minus1" and "coeff_sign_flag," respectively) within the block.

Accordingly, the techniques of this disclosure may enable entropy encoding unit 56 to encode scanning order information for the block more efficiently than when using other methods. In this manner, there may be a relative bit savings for a coded bitstream including the scanning order information when using the techniques of this disclosure.

Inverse quantization unit 58 and inverse transform module 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in memory 64. The reconstructed video block may be used by motion estimation unit 42 and motion compensation unit 44 as a reference block to inter-code a block in a subsequent video frame.

In this manner, video encoder 20 represents an example of a video coder configured to code information that identifies a scanning order associated with a block of video data, wherein to code the information that identifies the scanning order associated with the block, the video coder is configured to determine a most probable scanning order for the block, and code an indication of whether the scanning order associated with the block is the most probable scanning order.

Figure 3:
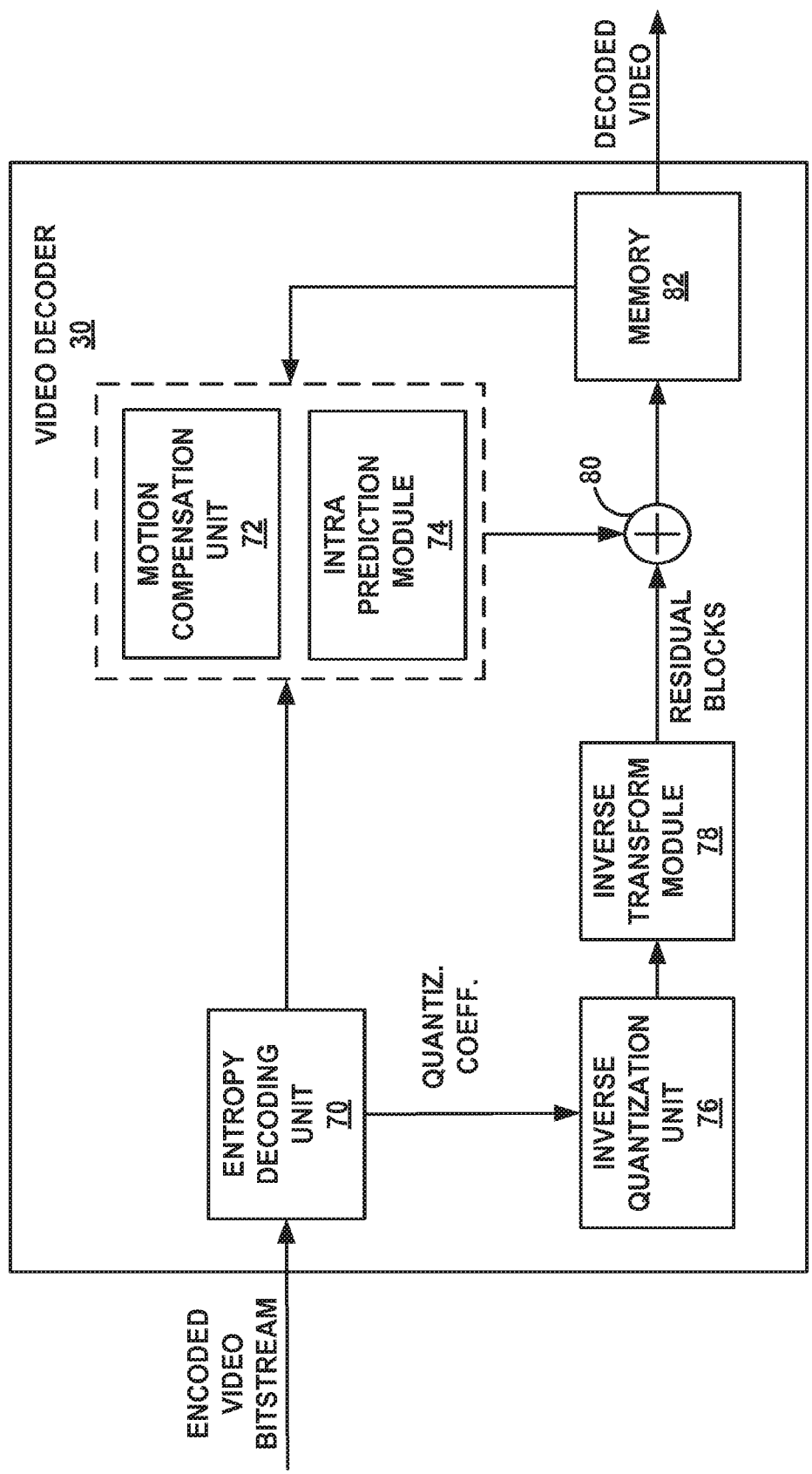
FIG. 3 is a block diagram that illustrates an example of a video decoder that may implement techniques for using a most probable scanning order to efficiently decode encoded scanning order information for a block of video data, consistent with the techniques of this disclosure.

FIG. 3 is a block diagram that illustrates an example of a video decoder 30 that may implement techniques for using a most probable scanning order to efficiently decode encoded scanning order information for a block of video data, consistent with the techniques of this disclosure. In the example of FIG. 3, video decoder 30 includes an entropy decoding unit 70, motion compensation unit 72, intra-prediction module 74, inverse quantization unit 76, inverse transform module 78, memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

In some examples, video decoder 30 may be configured to receive encoded video data (e.g., one or more macroblocks, or TUs of a CU) from video encoder 20. In accordance with the techniques of this disclosure, as one example, entropy decoding unit 70 may be configured to decode information that identifies a scanning order associated with the block, i.e., scanning order information for the block. For example, entropy decoding unit 70 may be configured to determine a most probable scanning order for the block, and decode an indication of whether the scanning order associated with the block is the most probable scanning order. In this example, each of the scanning order associated with the block and the most probable scanning order may comprise one of a zig-zag scanning order, a horizontal scanning order, and a vertical scanning order. Again, the zig-zag, horizontal, and vertical scanning orders are merely examples, and other scanning orders may also be defined or used consistent with the techniques of this disclosure.

To determine the most probable scanning order for the block, entropy decoding unit 70 may be configured to determine a most probable scanning order for the block based on a prediction mode and a size associated with the block, as described in greater detail below with reference to FIGS. 6A-6B.

Furthermore, to decode the indication of whether the scanning order associated with the block is the most probable scanning order, entropy decoding unit 70 may be configured to perform a context adaptive entropy coding process (e.g., a CABAC process) that includes applying a context model based on at least one context. For example, the at least one context may include one of the most probable scanning order, a prediction mode associated with the block, and a size associated with the block.

Additionally, the indication may comprise a single bin. For example, entropy decoding unit 70 may receive encoded scanning order data, and decode the scanning order data to determine the bin such that the bin indicates whether the scanning order is the most probable scanning order (e.g., bin="0") or otherwise (e.g., bin="1").

In another example, to decode the scanning order information for the block, entropy decoding unit 70 may be further configured to, in the event the scanning order associated with the block is not the most probable scanning order, decode an indication of the scanning order associated with the block.

In this example, to decode the indication of the scanning order associated with the block, entropy decoding unit 70 may be configured to perform a context adaptive entropy coding process (e.g., a CABAC process) that includes entropy decoding unit 70 applying a context model based on at least one context. For example, the at least one context may include one of the most probable scanning order, the prediction mode associated with the block, and the size associated with the block.

Furthermore, the indication of the scanning order associated with the block may also comprise a single bin. For example, entropy decoding unit 70 may be configured to receive additional encoded scanning order data, and decode the additional scanning order data to determine the bin such that the bin indicates whether the scanning order is a first scanning order (e.g., bin="0") or a second scanning order (e.g., bin="1"). In this example, the first and second scanning orders may comprise scanning orders, other than the most probable scanning order, that are also used to code blocks of video data within the corresponding coding system 10 comprising video encoder 20 and video decoder 30. It should be noted that, in other examples, the scanning order associated with the block may comprise one of a greater number (e.g., 3, 4, 5, . . . etc.) of scanning orders, other than the most probable scanning order, that are also used to code blocks of video data within system 10. As such, in other examples, entropy decoding unit 70 may be configured to decode the indication of the scanning order associated with the block using other techniques, e.g., decoding the additional scanning order data to determine multiple bins.

Accordingly, in this example, entropy decoding unit 70 may be configured to decode the scanning order information for the block by decoding the indication of whether the scanning order associated with the block is the most probable scanning order, and, in some cases, the indication of the scanning order associated with the block.

In another example, to decode the scanning order information for the block, entropy decoding unit 70 may be further configured to, in the event the scanning order associated with the block is not the most probable scanning order, use a zig-zag scanning order to decode the coefficients associated with the block. Accordingly, in this example, after determining the most probable scanning order for the block, and decoding the indication of whether the scanning order associated with the block is the most probable scanning order, entropy decoding unit 70 may be configured to not decode any additional scanning order information for the block.

In still another example, to determine the most probable scanning order for the block, entropy decoding unit 70 may be configured to designate a zig-zag scanning order as the most probable scanning order for the block. In this example, in a similar manner as described above, to decode the scanning order information for the block, entropy decoding unit 70 may be further configured to, in the event the scanning order associated with the block is not the most probable scanning order (i.e., in this particular example, the zig-zag scanning order), decode an indication of the scanning order associated with the block. In other words, in this example, entropy decoding unit 70 may be configured to presume the zig-zag scanning order to be the most probable scanning order for the block, rather than perform an actual determination of the most probable scanning order for the block, e.g., using scanning order information for previously decoded blocks.

In this example, to decode the indication of the scanning order associated with the block, entropy decoding unit 70 may be configured to perform a context adaptive entropy coding process (e.g., a CABAC process) that includes entropy decoding unit 70 applying a context model based on at least one context. For example, the at least one context may include one of the most probable scanning order, the prediction mode associated with the block, and the size associated with the block.

The indication of the scanning order associated with the block may once again comprise a single bin. For example, entropy decoding unit 70 may receive additional encoded scanning order data, and decode the additional scanning order data to determine the bin such that the bin indicates whether the scanning order is a first scanning order (e.g., bin="0") or a second scanning order (e.g., bin="1"). In this example, the first and second scanning orders may comprise scanning orders, other than the most probable scanning order (i.e., in this particular example, the zig-zag scanning order), that are also used to code blocks of video data within system 10. It should be noted that, in other examples, the scanning order associated with the block may comprise one of a greater number (e.g., 3, 4, 5, . . . etc.) of scanning orders, other than the most probable scanning order (i.e., in this particular example, the zig-zag scanning order), that are also used to code blocks of video data within system 10. As such, in other examples, entropy decoding unit 70 may decode the indication of the scanning order associated with the block using other techniques, e.g., decoding the additional scanning order data to determine multiple bins.

Accordingly, in this example, entropy decoding unit 70 may be configured to decode the scanning order information for the block by decoding the indication of whether the scanning order associated with the block is the most probable scanning order (i.e., in this particular example, the zig-zag scanning order), and, in some cases, the indication of the scanning order associated with the block.

To decode each bin (i.e., each bin used to represent the indication of whether the scanning order associated with the block is the most probable scanning order and the indication of the scanning order associated with the block) using the context adaptive entropy coding process described above, the corresponding context model may include probability estimates that indicate a probability of the bin comprising a given value (e.g., "0" or "1"). Entropy decoding unit 70 may use the probability estimates for the bin to decode the bin by performing the context adaptive entropy coding process. In some examples, entropy decoding unit 70 may determine the probability estimates using values of corresponding bins for previously decoded blocks of video data, e.g., blocks with a same associated prediction mode and size as the currently decoded block. In other examples, entropy decoding unit 70 also may update the probability estimates using the value of the bin to reflect the probability of the bin comprising a given value. For example, entropy decoding unit 70 may use the updated probability estimates to decode scanning order information for subsequently decoded blocks of video data in the manner described above.

In this example, entropy decoding unit 70 may be further configured to decode information that identifies a position of a last significant coefficient within the block according to the scanning order associated with the block, i.e., the last significant coefficient position information for the block. For example, the last significant coefficient position information for the block may be represented using a sequence of last significant coefficient flags, as previously described. Additionally, entropy decoding unit 70 may be further configured to decode information that identifies positions of all other significant coefficients within the block, i.e., the significant coefficient position information for the block. For example, the significant coefficient position information for the block also may be represented using a sequence of significant coefficient flags, as previously described. As also previously described, entropy decoding unit 70 may decode the last significant coefficient position information and the significant coefficient position information by decoding each flag of the respective sequence by performing a context adaptive entropy coding process (e.g., a CABAC process) that includes applying a context model based on a context. For example, the context may include a position of the flag within the block according to the scanning order associated with block.

In these examples, the context model may include probability estimates that indicate a probability of each flag comprising a given value (e.g., "0" or "1"). In some examples, entropy decoding unit 70 may determine the probability estimates using values of corresponding last significant coefficient flags and significant coefficient flags for previously decoded blocks of video data. In other examples, entropy decoding unit 70 also may update the probability estimates using the value of each flag to reflect the probability of the flag comprising a given value. For example, entropy decoding unit 70 may use the updated probability estimates to decode last significant coefficient position information and significant coefficient position information for subsequently decoded blocks of video data in the manner described above. It should be noted that, in other examples, entropy decoding unit 70 may decode the last significant coefficient position information and the significant coefficient position information for the block using other techniques.

In any case, after decoding the scanning order information, and the last significant coefficient position information and the significant coefficient position information, i.e., the SM data, for the block in the manner described above, entropy decoding unit 70 may also decode the value of each significant coefficient (e.g., each significant coefficient's magnitude and sign, indicated by syntax elements "coeff_abs_level_minus1" and "coeff_sign_flag," respectively) within the block.

Accordingly, the techniques of this disclosure may enable entropy decoding unit 70 to decode the scanning order information for the block more efficiently than when using other methods. In this manner, there may be a relative bit savings for a coded bitstream including the scanning order information when using the techniques of this disclosure.

Motion compensation unit 72 may use motion vectors received in the bitstream to identify a prediction block in reference frames in memory 82. Intra-prediction module 74 may use intra-prediction modes received in the bitstream to form a prediction block from spatially adjacent blocks.

Intra-prediction module 74 may use an indication of an intra-prediction mode for the encoded block to intra-predict the encoded block, e.g., using pixels of neighboring, previously decoded blocks. For examples in which the block is inter-prediction mode encoded, motion compensation unit 72 may receive information defining a motion vector, in order to retrieve motion compensated prediction data for the encoded block. In any case, motion compensation unit 72 or intra-prediction module 74 may provide information defining a prediction block to summer 80.

Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard or as performed by the HEVC Test Model. The inverse quantization process may also include use of a quantization parameter $QP_Y$ calculated by video encoder 20 for each block to determine a degree of quantization and, likewise, a degree of inverse quantization that should be applied.

Inverse transform module 78 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information for the encoded block to determine sizes of blocks used to encode frame(s) of the encoded video sequence, partition information that describes how each block of a frame or slice of the encoded video sequence is partitioned, modes indicating how each partition is encoded, one or more reference frames (and reference frame lists) for each inter-encoded block or partition, and other information to decode the encoded video sequence. Intra-prediction module 74 may also use the syntax information for the encoded block to intra-predict the encoded block, e.g., using pixels of neighboring, previously decoded blocks, as described above.

Summer 80 sums the residual blocks with the corresponding prediction blocks generated by motion compensation unit 72 or intra-prediction module 74 to form decoded blocks. If desired, a deblocking filter may also be applied to filter the decoded blocks in order to remove blockiness artifacts. The decoded video blocks are then stored in memory 82, which provides reference blocks for subsequent motion compensation and also produces decoded video for presentation on a display device (such as display device 32 of FIG. 1).

In this manner, video decoder 30 represents an example of a video coder configured to code information that identifies a scanning order associated with a block of video data, wherein to code the information that identifies the scanning order associated with the block, the video coder is configured to determine a most probable scanning order for the block, and code an indication of whether the scanning order associated with the block is the most probable scanning order.

FIGS. 4A-4C are conceptual diagrams that illustrate an example of a block of video data and corresponding significant coefficient position information and last significant coefficient position information. As shown in FIG. 4A, a block of video data, e.g., a macroblock, or a TU of a CU, may include quantized transform coefficients. For example, as shown in FIG. 4A, block 400 may include quantized transform coefficients generated using prediction, transform, and quantization techniques previously described. Assume, for this example, that block 400 has a size of 2N×2N, wherein N equals to two. Accordingly, block 400 has a size of 4×4, and includes sixteen quantized transform coefficients, as also shown in FIG. 4A. Assume further, that the scanning order associated with block 400 is the zig-zag scanning order, as shown in FIG. 5A described in greater detail below.

In this example, a last significant coefficient within block 400 according to the zig-zag scanning order is a quantized transform coefficient equal to "1," located in position 406 within block 400. In other examples, as described above, a block may have a size that is smaller or larger than the size of block 400, and may include more or fewer quantized transform coefficients than block 400. In still other examples, the scanning order associated with block 400 may be a different scanning order, e.g., a horizontal scanning order, a vertical scanning order, a diagonal scanning order, or another scanning order.

FIG. 4B illustrates an example of significant coefficient flag data, i.e., significant coefficient flags represented in map, or block form, as previously described. In the example of FIG. 4B, block 402 may correspond to block 400 depicted in FIG. 4A. In other words, the significant coefficient flags of block 402 may correspond to the quantized transform coefficients of block 400. As shown in FIG. 4B, the significant coefficient flags of block 402 that are equal to "1" correspond to significant coefficients of block 400. Similarly, the significant coefficient flags of block 402 that are equal to "0" correspond to zero, or non-significant coefficients of block 400.

In this example, a significant coefficient flag of block 402 corresponding to the last significant coefficient within block 400 according to the zig-zag scanning order is a significant coefficient flag equal to "1," located in position 408 within block 402. In other examples, the values of significant coefficient flags used to indicate significant or non-significant coefficients may vary (e.g., significant coefficient flags equal to "0" may correspond to significant coefficients, and significant coefficient flags equal to "1" may correspond to non-significant coefficients).

FIG. 4C illustrates an example of last significant coefficient flag data, i.e., last significant coefficient flags represented in map, or block form, as also previously described.

In the example of FIG. 4C, block 404 may correspond to block 400 and block 402 depicted in FIG. 4A and FIG. 4B, respectively. In other words, the last significant coefficient flags of block 404 may correspond to the quantized transform coefficients of block 400, and to the significant coefficient flags of block 402.

As shown in FIG. 4C, the last significant coefficient flag of block 404 that is equal to "1," located in position 410 within block 404, corresponds to a last significant coefficient of block 400, and to a last one of the significant coefficient flags of block 402 that are equal to "1," according to the zig-zag scanning order. Similarly, the last significant coefficient flags of block 404 that are equal to "0" (i.e., all remaining last significant coefficient flags) correspond to zero, or non-significant coefficients of block 400, and to all significant coefficient flags of block 402 that are equal to "1" other than the last one of such significant coefficient flags according to the zig-zag scanning order.

The values of the last significant coefficient flags used to indicate a last significant coefficient according to a scanning order may vary (e.g., a last significant coefficient flag equal to "0" may correspond to a last significant coefficient according to the scanning order, and last significant coefficient flags equal to "1" may correspond to all remaining coefficients). In any case, the significant coefficient flags of block 402, and the last significant coefficient flags of block 404, may be collectively referred to as SM data for block 400.

As described above, significant coefficient position information for a block of video data may be indicated by serializing significant coefficient flags for the block from a two-dimensional block representation, as depicted in block 402 shown in FIG. 4B, into a one-dimensional array, using a scanning order associated with the block. In the example of blocks 400-402 shown in FIGS. 4A-4B, again assuming the zig-zag scanning order, the significant coefficient position information for block 400 may be indicated by serializing the significant coefficient flags of block 402 into a one-dimensional array. That is, the significant coefficient position information for block 400 may be indicated by generating a sequence of significant coefficient flags of block 402 according to the zig-zag scanning order.

In this example, the generated sequence may correspond to a value "111111," representing the first 6 significant coefficient flags of block 402 according to the zig-zag scanning order. It should be noted that the generated sequence may contain significant coefficient flags corresponding to a range of block positions within block 400, starting from a first block position in the zig-zag scanning order (i.e., the DC position) and ending with a block position corresponding to the last significant coefficient of block 400 according to the zig-zag scanning order (i.e., corresponding to the last significant coefficient flag equal to "1" of block 404).

As also described above, last significant coefficient position information for the block may be indicated by serializing last significant coefficient flags for the block from a two-dimensional block representation, as depicted in block 404 shown in FIG. 4C, into a one-dimensional array, using a scanning order associated with the block. In the example of blocks 400-404 shown in FIGS. 4A-4C, again assuming the zig-zag scanning order, the last significant coefficient position information for block 400 may be indicated by serializing the last significant coefficient flags of block 404 into a one-dimensional array. That is, the last significant coefficient position information for block 400 may be indicated by generating a sequence of last significant coefficient flags of block 404 according to the zig-zag scanning order. In this example, the generated sequence may correspond to a value "000001," representing the first 6 last significant coefficient flags of block 404 according to the zig-zag scanning order.

Once again, it should be noted that the generated sequence may contain last significant coefficient flags corresponding to a range of block positions within block 400, starting from the first block position in the zig-zag scanning order, and ending with the block position corresponding to the last significant coefficient of block 400 according to the zig-zag scanning order (i.e., corresponding to the last significant coefficient flag equal to "1" of block 404). Accordingly, in this example, no last significant coefficient flags following the last significant coefficient flag equal to "1" according to the zig-zag scanning order are included in the sequence. Generally speaking, last significant coefficient flags following a last significant coefficient flag equal to "1" according to a scanning order associated with a block of video data may not be needed to indicate last significant coefficient position information for the block. As such, in some examples, these flags are omitted from the generated sequence of last significant coefficient flags used to indicate the information.

It should also be noted that, as described above, if the last significant coefficient is located within a last block position according to the scanning order (e.g., the bottom right block position), the generated sequence may not include a last significant coefficient flag corresponding to the last block position, because the position may be inferred to contain the last significant coefficient for the block. Accordingly, in this example, the generated sequence may correspond to a value "000000000000000," wherein the last significant coefficient flag corresponding to the last block position is not included in the sequence, and is inferred to equal "1."

FIGS. 5A-5C are conceptual diagrams that illustrate examples of blocks of video data scanned using a zig-zag scanning order, a horizontal scanning order, and a vertical scanning order, respectively. As shown in FIGS. 5A-5C, an 8×8 block of video data, e.g., a macroblock, or a TU of a CU, may include sixty-four quantized transform coefficients in corresponding block positions, denoted with circles. For example, blocks 500-504 may each include sixty-four quantized transform coefficients generated using prediction, transform, and quantization techniques previously described, again, wherein each corresponding block position is denoted with a circle. Assume, for this example, that blocks 500-504 have a size of 2N×2N, wherein N equals to four. Accordingly, blocks 500-504 have a size of 8×8.

As shown in FIG. 5A, the scanning order associated with block 500 is the zig-zag scanning order. The zig-zag scanning order scans the quantized transform coefficients of block 500 in a diagonal manner as indicated by the arrows in FIG. 5A. Similarly, as shown in FIGS. 5B and 5C, the scanning orders associated with blocks 502 and 504 are the horizontal scanning order and the vertical scanning order, respectively. The horizontal scanning order scans the quantized transform coefficients of block 502 in a horizontal line-by-line, or "raster" manner, while the vertical scanning order scans the quantized transform coefficients of block 504 in a vertical line-by-line, or "rotated raster" manner, also as indicated by the arrows in FIGS. 5B and 5C.

In other examples, as described above, a block may have a size that is smaller or larger than the size of blocks 500-504, and may include more or fewer quantized transform coefficients and corresponding block positions. In these examples, a scanning order associated with the block may scan the quantized transform coefficients of the block in a substantially similar manner as shown in the examples of the 8×8 blocks 500-504 of FIGS. 5A-5C, e.g., a 4×4 block, or a 16×16 block, may be scanned following any of the scanning orders previously described.

As previously described, the techniques of this disclose may also apply with respect to a wide variety of other scanning orders, including a diagonal scanning order, scanning orders that are combinations of zigzag, horizontal, vertical, and/or diagonal scanning orders, as well as scanning orders that are partially zigzag, partially horizontal, partially vertical, and/or partially diagonal.

Figure 6A:
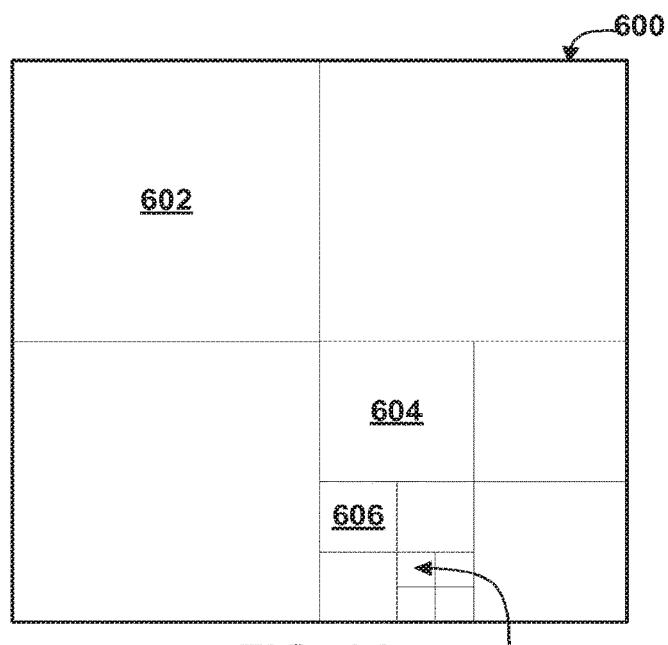
FIGS. 6A-6B are conceptual diagrams that illustrate examples of blocks video data having various sizes, and examples of blocks of video data for which various prediction modes are used to generate prediction data, consistent with the techniques of this disclosure.
Figure 6B:
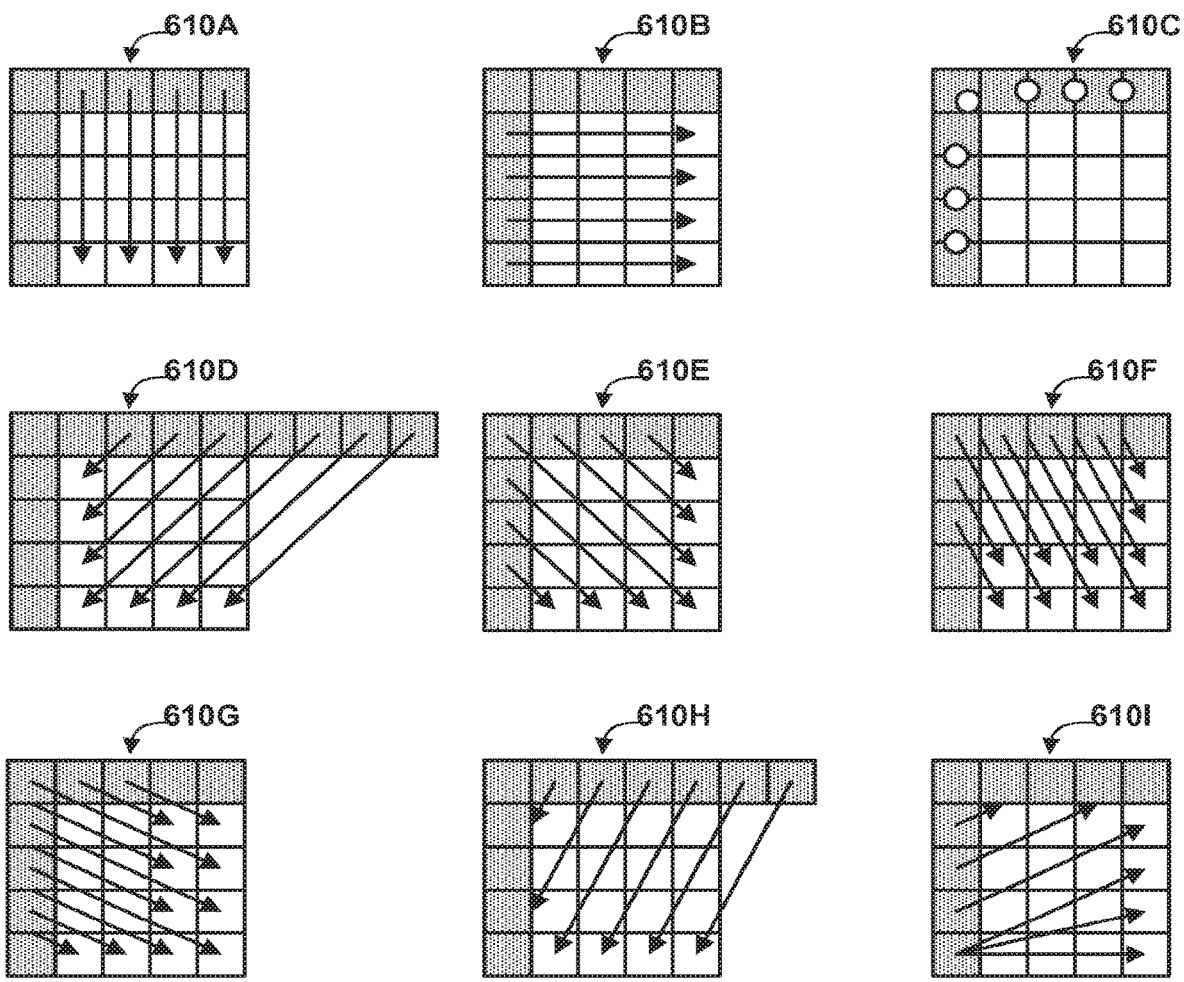

FIGS. 6A-6B are conceptual diagrams that illustrate examples of blocks video data having various sizes, and examples of blocks of video data for which various prediction modes are used to generate prediction data, consistent with the techniques of this disclosure. As shown in FIG. 6A, block 600, e.g., a macroblock, or a TU of a CU of video data, may have a particular size. Assume for this example that the size of block 600 is 2N×2N, where N equals to thirty-two. Accordingly, block 600 has a size of 64×64. Assume further that block 600 is recursively partitioned, or split, into smaller blocks, including blocks 602-608 also shown in FIG. 6A, as previously described with reference to FIG. 1. Assume, for example, that block 602 has a size of 32×32, block 604 has a size of 16×16, block 606 has a size of 8×8, and block 608 has a size of 4×4. In other examples, block 600 may be partitioned into more or fewer smaller blocks than blocks 602-608. In still other examples, block 600 and any partitions thereof may have different sizes than the sizes of blocks 600-608.

As shown in FIG. 6B, blocks 610A-610I may each be coded using one of a variety of prediction modes. The different illustrations of FIG. 6B show different directional prediction modes, in which prediction data may be obtained or derived from neighboring pixel data according to the directional arrows shown in the different illustrations. Other intra-prediction modes, such as a DC mode, a planar mode, or other directional prediction modes, may also be used. In some cases, thirty-three different intra-prediction modes may be supported. In any case, as shown in FIG. 6B, each of blocks 610A-610I may be coded using a unique intra-prediction mode, as illustrated for each of blocks 610A-610I, wherein pixels of neighboring blocks of video data are used to predict pixels of the respective block. In other examples, blocks 610A-610I may be coded using other prediction modes not shown in FIG. 6B.

As such, in accordance with the techniques of this disclosure, at least one of the block sizes associated with blocks 600-608 depicted in FIG. 6A, and the prediction modes associated with blocks 610A-610I depicted in FIG. 6B, may each be used as a context when performing a context adaptive entropy coding process (e.g., a CABAC process) to code scanning order information for a particular one of blocks 600-608 and 610A-610I, as previously described.

Figure 7:
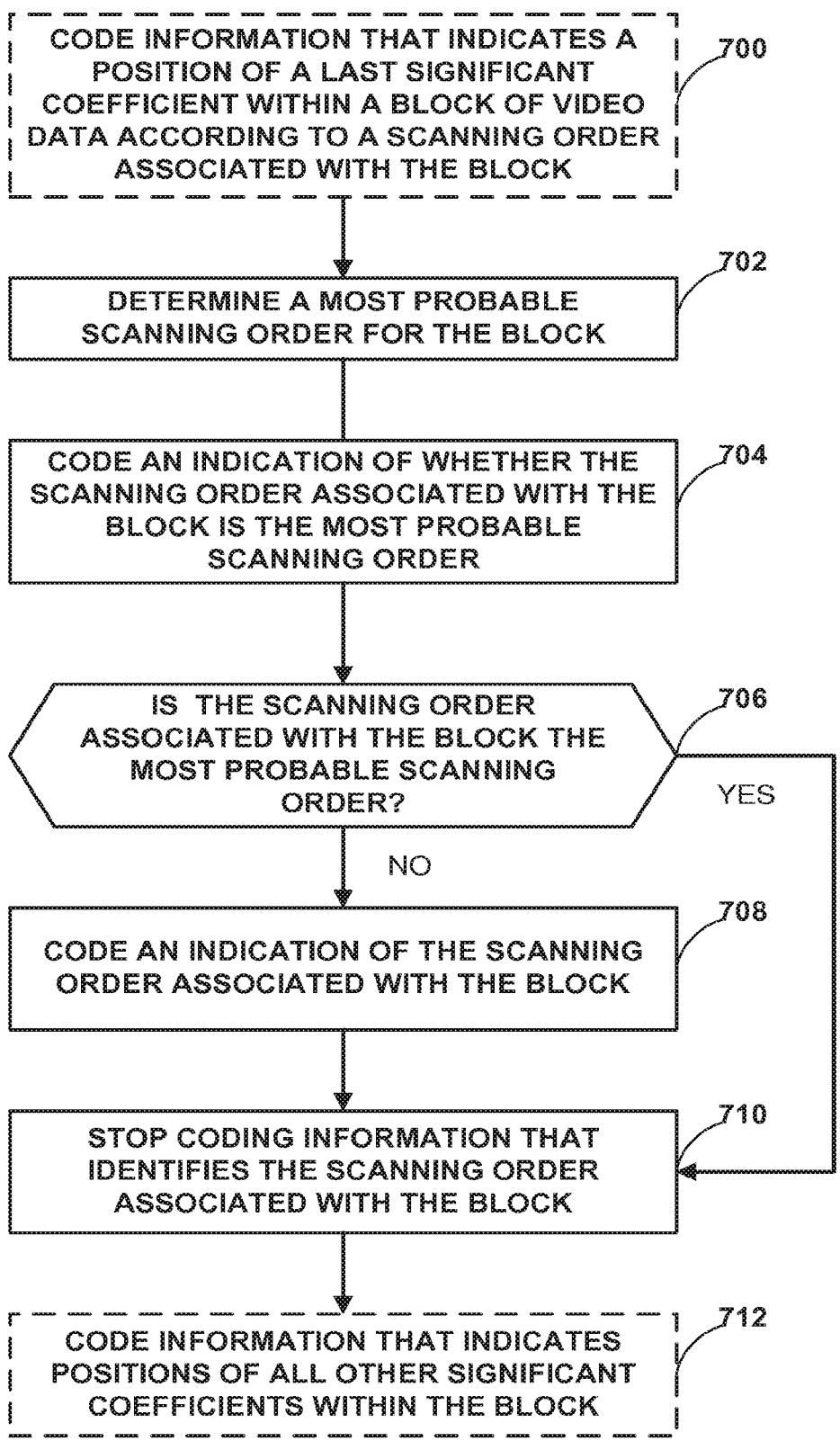
FIG. 7 is a flowchart that illustrates an example of a method for using a most probable scanning order to efficiently code scanning order information for a block of video data, consistent with the techniques of this disclosure.

FIG. 7 is a flowchart that illustrates an example method for using a most probable scanning order to efficiently code scanning order information for a block of video data consistent with the techniques of this disclosure. The techniques of FIG. 7 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 7 are described with respect to video encoder 20 (FIGS. 1 and 2) and/or video decoder 30 (FIGS. 1 and 3), although it should be understood that other devices may be configured to perform similar techniques. Moreover, the steps illustrated in FIG. 7 may be performed in a different order or in parallel, and additional steps may be added and certain steps omitted, without departing from the techniques of this disclosure.

Initially, in some examples, video encoder 20 and/or video decoder 30 may code information that indicates a position of a last significant coefficient within a block of video data according to a scanning order associated with the block (700), i.e., the last significant coefficient position information for the block. For example, the block may be a macroblock, or a TU of a CU, as previously described. Furthermore, the scanning order associated with the block may comprise one of a zig-zag scanning order, a horizontal scanning order, and a vertical scanning order. In this manner, the example method of FIG. 7 may be applicable to any coding system that uses a plurality of scanning orders to code blocks of video data.

In some examples, the last significant coefficient position information for the block may be represented using a sequence of last significant coefficient flags, as previously described. As also previously described, video encoder 20 and/or video decoder 30 may code the last significant coefficient position information by coding each last significant coefficient flag of the sequence by performing a context adaptive entropy coding process (e.g., a CABAC process) that includes applying a context model based on a context. For example, the context may include a position of the flag within the block according to the scanning order associated with block.

In these examples, the context model may include probability estimates that indicate a probability of each flag comprising a given value (e.g., "0" or "1"). In some examples, video encoder 20 and/or video decoder 30 may determine the probability estimates using values of corresponding last significant coefficient flags for previously coded blocks of video data. In other examples, video encoder 20 and/or video decoder 30 also may update the probability estimates using the value of each flag to reflect the probability of the flag comprising a given value. For example, video encoder 20 and/or video decoder 30 may use the updated probability estimates to code last significant coefficient position information for subsequently coded blocks of video data in the manner described above. It should be noted that, in other examples, video encoder 20 and/or video decoder 30 may code the last significant coefficient position information for the block using other techniques.

Video encoder 20 and/or video decoder 30 may further determine a most probable scanning order for the block (702). For example, to determine the most probable scanning order for the block, video encoder 20 and/or video decoder 30 may determine a most probable scanning order for the block based on a prediction mode and a size associated with the block, as previously described with reference to FIGS. 6A-6B. As one example, video encoder 20 and/or video decoder 30 may make this determination using scanning order information for previously coded blocks, e.g., blocks with a same associated prediction mode and size as the currently coded block. The most probable scanning order may also comprise one of a zig-zag scanning order, a horizontal scanning order, and a vertical scanning order.

Video encoder 20 and/or video decoder 30 may further code an indication of whether the scanning order associated with the block is the most probable scanning order (704).

Figure 8:
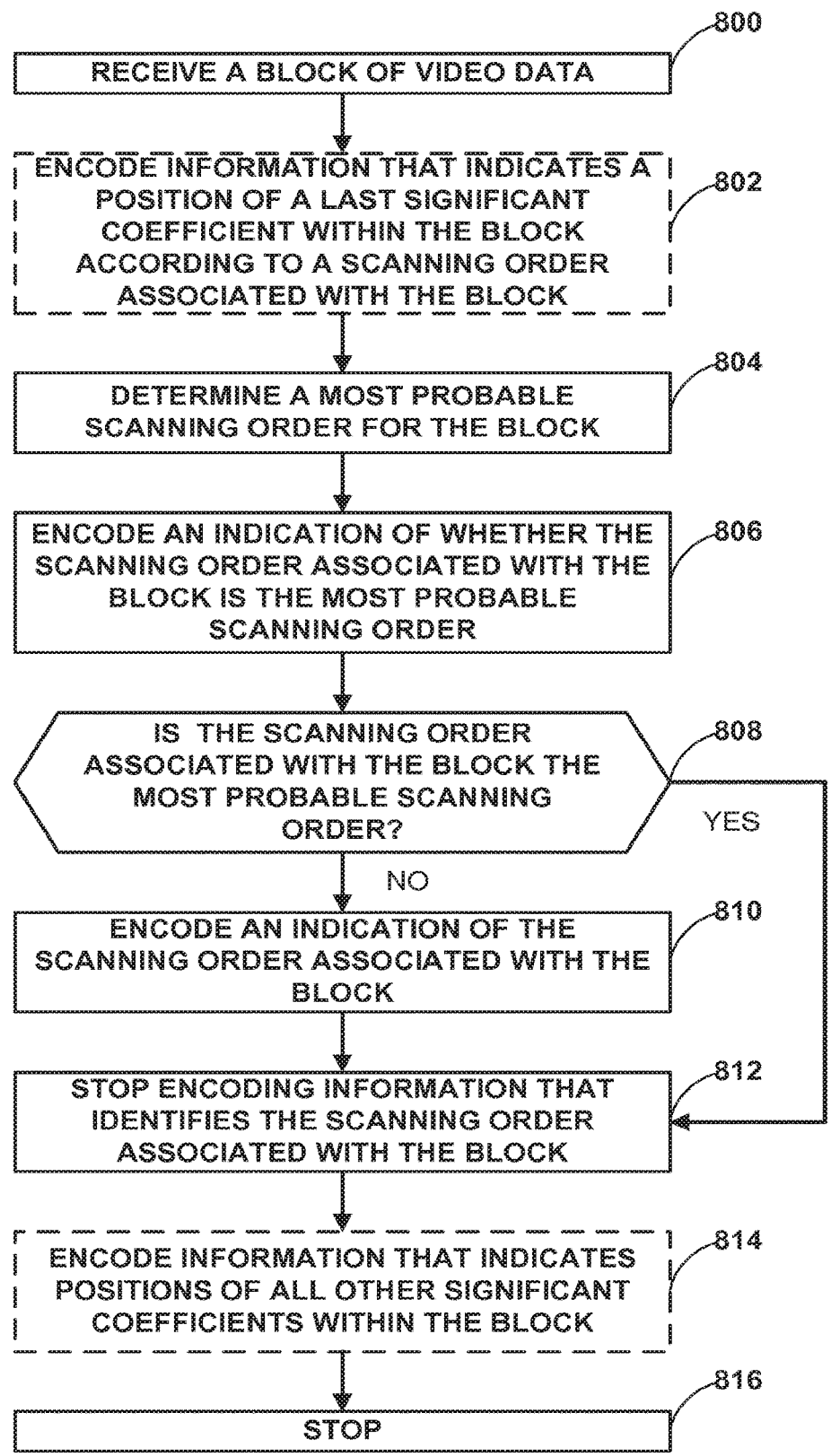
FIG. 8 is a flowchart that illustrates an example of a method for using a most probable scanning order to efficiently encode scanning order information for a block of video data, consistent with the techniques of this disclosure.
Figure 9:
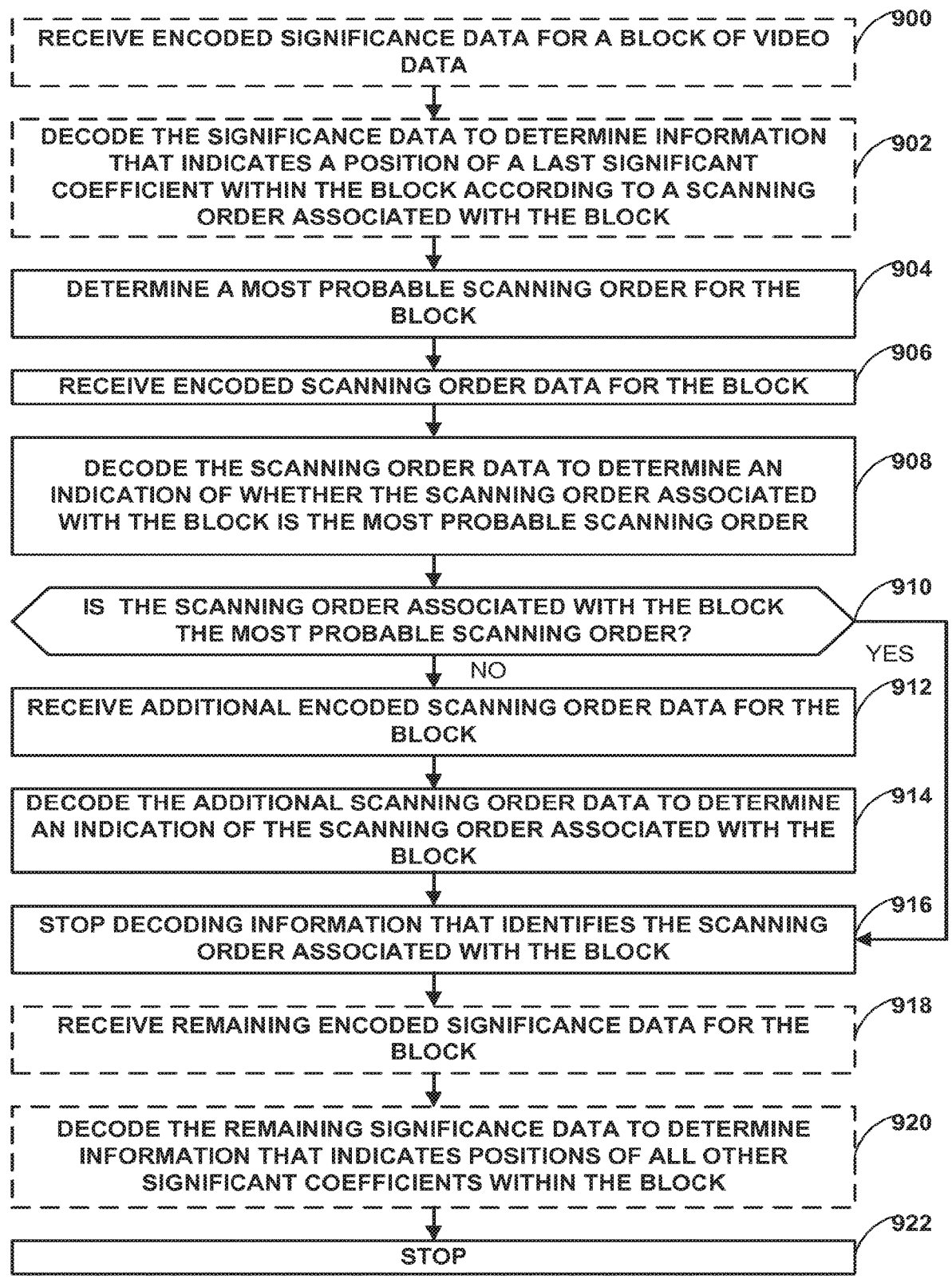
FIG. 9 is a flowchart that illustrates an example of a method for using a most probable scanning order to efficiently decode encoded scanning order information for a block of video data, consistent with the techniques of this disclosure.

For example, video encoder 20 may encode the indication, as described in greater detail in the example method of FIG. 8, and video decoder 30 may decode the indication, as described in greater detail in the example method of FIG. 9. Video encoder 20 and/or video decoder 30 may code the indication by performing a context adaptive entropy coding process (e.g., a CABAC process) that includes applying a context model based on at least one context. For example, the at least one context may include one of the most probable scanning order, the prediction mode associated with the block, and the size associated with the block. The indication may comprise a single bit, or "bin." For example, video encoder 20 and/or video decoder 30 may code the bin to indicate whether the scanning order is the most probable scanning order (e.g., bin="0") or otherwise (e.g., bin="1").

In the event the scanning order associated with the block is the most probable scanning order (706), video encoder 20 and/or video decoder 30 may stop coding the information that identifies the scanning order associated with the block (710), i.e., the scanning order information for the block. For example, video encoder 20 and/or video decoder 30 may proceed to other coding tasks, e.g., coding of other syntax elements for the block, or a subsequent block, as described above.

In the event the scanning order associated with the block is not the most probable scanning order (706), however, video encoder 20 and/or video decoder 30 may further code an indication of the scanning order associated with the block (708). Once again, video encoder 20 and/or video decoder 30 may code the indication by performing a context adaptive entropy coding process (e.g., a CABAC process) that includes applying a context model based on at least one context. For example, the at least one context may include one of the most probable scanning order, the prediction mode associated with the block, and the size associated with the block. The indication of the scanning order associated with the block may also comprise a single bin. For example, video encoder 20 and/or video decoder 30 may code the bin to indicate whether the scanning order is a first scanning order (e.g., bin="0") or a second scanning order (e.g., bin="1"). In this example, the first and second scanning orders may comprise scanning orders, other than the most probable scanning order, that are also used to code blocks of video data within the corresponding coding system 10 comprising video encoder 20 and video decoder 30. It should be noted that, in other examples, the scanning order associated with the block may comprise one of a greater number (e.g., 3, 4, 5, . . . etc.) of scanning orders, other than the most probable scanning order, that are also used to code blocks of video data within system 10. As such, in other examples, video encoder 20 and/or video decoder 30 may code the indication of the scanning order associated with the block using other techniques, e.g., using multiple bins.

To code each bin (i.e., each bin used to represent the indication of whether the scanning order associated with the block is the most probable scanning order and the indication of the scanning order associated with the block) using the context adaptive entropy coding process described above, the corresponding context model may include probability estimates that indicate a probability of the bin comprising a given value (e.g., "0" or "1"). Video encoder 20 and/or video decoder 30 may use the probability estimates for the bin to code the bin by performing the context adaptive entropy coding process. In some examples, video encoder 20 and/or video decoder 30 may determine the probability estimates using values of corresponding bins for previously coded blocks of video data, e.g., blocks with a same associated prediction mode and size as the currently coded block. In other examples, video encoder 20 and/or video decoder 30 also may update the probability estimates using the value of the bin to reflect the probability of the bin comprising a given value. For example, video encoder 20 and/or video decoder 30 may use the updated probability estimates to code scanning order information for subsequently coded blocks of video data in the manner described above.

In any case, after coding the indication of the scanning order associated with the block (708), video encoder 20 and/or video decoder 30 may stop coding the information that identifies the scanning order associated with the block (710), i.e., the scanning order information for the block. Once again, for example, video encoder 20 and/or video decoder 30 may proceed to other coding tasks, e.g., coding of other syntax elements for the block, or a subsequent block, as described above.

In some examples, video encoder 20 and/or video decoder 30 may further code information that indicates positions of all other significant coefficients within the block (712), i.e., the significant coefficient position information for the block. For example, the significant coefficient position information for the block may be represented using a sequence of significant coefficient flags, as previously described. As also previously described, video encoder 20 and/or video decoder 30 may code the significant coefficient position information by coding each significant coefficient flag of the sequence by performing a context adaptive entropy coding process (e.g., a CABAC process) that includes applying a context model based on a context. For example, the context may include a position of the flag within the block according to the scanning order associated with block.

In these examples, the context model may include probability estimates that indicate a probability of each flag comprising a given value (e.g., "0" or "1"). In some examples, video encoder 20 and/or video decoder 30 may determine the probability estimates using values of corresponding significant coefficient flags for previously coded blocks of video data. In other examples, video encoder 20 and/or video decoder 30 also may update the probability estimates using the value of each flag to reflect the probability of the flag comprising a given value. For example, video encoder 20 and/or video decoder 30 may use the updated probability estimates to code significant coefficient position information for subsequently coded blocks of video data in the manner described above. It should be noted that, in other examples, video encoder 20 and/or video decoder 30 may code the significant coefficient position information for the block using other techniques.

In this manner, the method of FIG. 7 represents an example of a method of coding information that identifies a scanning order associated with a block of video data, including determining a most probable scanning order for the block, and coding an indication of whether the scanning order associated with the block is the most probable scanning order.

FIG. 8 is a flowchart that illustrates an example method for using a most probable scanning order to efficiently encode scanning order information for a block of video data consistent with the techniques of this disclosure. The techniques of FIG. 8 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 8 are described with respect to entropy encoding unit 56 (FIG. 2), although it should be understood that other devices may be configured to perform similar techniques. Moreover, the steps illustrated in FIG. 8 may be performed in a different order or in parallel, and additional steps may be added and certain steps omitted, without departing from the techniques of this disclosure.

Initially, entropy encoding unit 56 may receive a block of video data (800). For example, the block may be a macroblock, or a TU of a CU, as previously described. In some examples, entropy encoding unit 56 may further encode information that indicates a position of a last significant coefficient within the block according to a scanning order associated with the block (802), i.e., the last significant coefficient position information for the block. For example, the scanning order associated with the block may comprise one of a zig-zag scanning order, a horizontal scanning order, and a vertical scanning order. In this manner, the example method of FIG. 8 may be applicable to any coding system that uses a plurality of scanning orders to code blocks of video data.

In some examples, the last significant coefficient position information for the block may be represented using a sequence of last significant coefficient flags, as previously described. As also previously described, entropy encoding unit 56 may encode the last significant coefficient position information by encoding each last significant coefficient flag of the sequence by performing a context adaptive entropy coding process (e.g., a CABAC process) that includes applying a context model based on a context. For example, the context may include a position of the flag within the block according to the scanning order associated with block.

In these examples, the context model may include probability estimates that indicate a probability of each flag comprising a given value (e.g., "0" or "1"). In some examples, entropy encoding unit 56 may determine the probability estimates using values of corresponding last significant coefficient flags for previously encoded blocks of video data. In other examples, entropy encoding unit 56 also may update the probability estimates using the value of each flag to reflect the probability of the flag comprising a given value. For example, entropy encoding unit 56 may use the updated probability estimates to encode last significant coefficient position information for subsequently encoded blocks of video data in the manner described above. It should be noted that, in other examples, entropy encoding unit 56 may encode the last significant coefficient position information for the block using other techniques.

Entropy encoding unit 56 may further determine a most probable scanning order for the block (804). For example, to determine the most probable scanning order for the block, entropy encoding unit 56 may determine a most probable scanning order for the block based on a prediction mode and a size associated with the block, as previously described with reference to FIGS. 6A-6B. As one example, entropy encoding unit 56 may make this determination using scanning order information for previously encoded blocks, e.g., blocks with a same associated prediction mode and size as the currently encoded block. The most probable scanning order may also comprise one of a zig-zag scanning order, a horizontal scanning order, and a vertical scanning order.

Entropy encoding unit 56 may further encode an indication of whether the scanning order associated with the block is the most probable scanning order (806). Entropy encoding unit 56 may encode the indication by performing a context adaptive entropy coding process (e.g., a CABAC process) that includes applying a context model based on at least one context. For example, the at least one context may include one of the most probable scanning order, the prediction mode associated with the block, and the size associated with the block. The indication may comprise a single bin. For example, entropy encoding unit 56 may encode the bin to indicate whether the scanning order is the most probable scanning order (e.g., bin="0") or otherwise (e.g., bin="1").

In the event the scanning order associated with the block is the most probable scanning order (808), entropy encoding unit 56 may stop encoding the information that identifies the scanning order associated with the block (816), i.e., the scanning order information for the block. For example, entropy encoding unit 56 may proceed to other coding tasks, e.g., encoding of other syntax elements for the block, or a subsequent block, as described above.

In the event the scanning order associated with the block is not the most probable scanning order (808), however, entropy encoding unit 56 may further encode an indication of the scanning order associated with the block (810). Once again, entropy encoding unit 56 may code the indication by performing a context adaptive entropy coding process (e.g., a CABAC process) that includes applying a context model based on at least one context. For example, the at least one context may include one of the most probable scanning order, the prediction mode associated with the block, and the size associated with the block. The indication of the scanning order associated with the block may also comprise a single bin. For example, entropy encoding unit 56 may encode the bin to indicate whether the scanning order is a first scanning order (e.g., bin="0") or a second scanning order (e.g., bin="1"), wherein the first and second scanning orders comprise scanning orders, other than the most probable scanning order, that are also used to code blocks of video data within the corresponding coding system 10 comprising video encoder 20 and video decoder 30. It should be noted that, in other examples, the scanning order associated with the block may comprise one of a greater number (e.g., 3, 4, 5, . . . etc.) of scanning orders, other than the most probable scanning order, that are also used to code blocks of video data within system 10. As such, in other examples, entropy encoding unit 56 may encode the indication of the scanning order associated with the block using other techniques, e.g., using multiple bins.

To encode each bin (i.e., each bin used to represent the indication of whether the scanning order associated with the block is the most probable scanning order and the indication of the scanning order associated with the block) using the context adaptive entropy coding process described above, the corresponding context model may include probability estimates that indicate a probability of the bin comprising a given value (e.g., "0" or "1"). Entropy encoding unit 56 may use the probability estimates for the bin to encode the bin by performing the context adaptive entropy coding process. In some examples, entropy encoding unit 56 may determine the probability estimates using values of corresponding bins for previously encoded blocks of video data, e.g., blocks with a same associated prediction mode and size as the currently coded block. In other examples, entropy encoding unit 56 also may update the probability estimates using the value of the bin to reflect the probability of the bin comprising a given value. For example, entropy encoding unit 56 may use the updated probability estimates to encode scanning order information for subsequently encoded blocks of video data in the manner described above.

In any case, after encoding the indication of the scanning order associated with the block (810), entropy encoding unit 56 may stop encoding the information that identifies the scanning order associated with the block (812), i.e., the scanning order information for the block. Once again, for example, entropy encoding unit 56 may proceed to other coding tasks, e.g., encoding of other syntax elements for the block, or a subsequent block, as described above.

In some examples, entropy encoding unit 56 may further encode information that indicates positions of all other significant coefficients within the block (814), i.e., the significant coefficient position information for the block. For example, the significant coefficient position information for the block may be represented using a sequence of significant coefficient flags, as previously described. As also previously described, entropy encoding unit 56 may encode the significant coefficient position information by encoding each significant coefficient flag of the sequence by performing a context adaptive entropy coding process (e.g., a CABAC process) that includes applying a context model based on a context. For example, the context may include a position of the flag within the block according to the scanning order associated with block.

In these examples, the context model may include probability estimates that indicate a probability of each flag comprising a given value (e.g., "0" or "1"). In some examples, entropy encoding unit 56 may determine the probability estimates using values of corresponding significant coefficient flags for previously encoded blocks of video data. In other examples, entropy encoding unit 56 also may update the probability estimates using the value of each flag to reflect the probability of the flag comprising a given value. For example, entropy encoding unit 56 may use the updated probability estimates to encode significant coefficient position information for subsequently encoded blocks of video data in the manner described above. It should be noted that, in other examples, entropy encoding unit 56 may encode the significant coefficient position information for the block using other techniques.

Finally, entropy encoding unit 56 may stop encoding the block (816). For example, entropy encoding unit 56 may proceed to other coding tasks, e.g., encoding subsequent blocks, as described above.

In this manner, the method of FIG. 8 represents an example of a method of encoding information that identifies a scanning order associated with a block of video data, including determining a most probable scanning order for the block, and coding an indication of whether the scanning order associated with the block is the most probable scanning order.

FIG. 9 is a flowchart that illustrates an example method for using a most probable scanning order to efficiently decode encoded scanning order information for a block of video data consistent with the techniques of this disclosure. The techniques of FIG. 9 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 9 are described with respect to entropy decoding unit 70 (FIG. 3), although it should be understood that other devices may be configured to perform similar techniques. Moreover, the steps illustrated in FIG. 9 may be performed in a different order or in parallel, and additional steps may be added and certain steps omitted, without departing from the techniques of this disclosure.

Initially, entropy decoding unit 70 may receive encoded significance data for a block of video data (900). For example, the block may be a macroblock, or a TU of a CU, as previously described. Entropy decoding unit 70 may further decode the significance data to determine information that indicates a position of a last significant coefficient within the block according to a scanning order associated with the block (902), i.e., the last significant coefficient position information for the block. For example, the scanning order associated with the block may comprise one of a zig-zag scanning order, a horizontal scanning order, and a vertical scanning order. In this manner, the example method of FIG. 9 may be applicable to any coding system that uses a plurality of scanning orders to code blocks of video data.

In some examples, the last significant coefficient position information for the block may be represented using a sequence of last significant coefficient flags, as previously described. As also previously described, entropy decoding unit 70 may decode the significance data to determine the last significant coefficient position information by decoding the significance data to generate each last significant coefficient flag of the sequence. For example, entropy decoding unit 70 may perform a context adaptive entropy coding process (e.g., a CABAC process) that includes applying a context model based on a context, wherein the context may include a position of the flag within the block according to the scanning order associated with block.

In these examples, the context model may include probability estimates that indicate a probability of each flag comprising a given value (e.g., "0" or "1"). In some examples, entropy decoding unit 70 may determine the probability estimates using values of corresponding last significant coefficient flags for previously decoded blocks of video data. In other examples, entropy decoding unit 70 also may update the probability estimates using the value of each flag to reflect the probability of the flag comprising a given value. For example, entropy decoding unit 70 may use the updated probability estimates to decode last significant coefficient position information for subsequently decoded blocks of video data in the manner described above. It should be noted that, in other examples, entropy decoding unit 70 may decode the last significant coefficient position information for the block using other techniques.

Entropy decoding unit 70 may further determine a most probable scanning order for the block (904). For example, to determine the most probable scanning order for the block, entropy decoding unit 70 may determine a most probable scanning order for the block based on a prediction mode and a size associated with the block, as previously described with reference to FIGS. 6A-6B. As one example, entropy decoding unit 70 may make this determination using scanning order information for previously decoded blocks, e.g., blocks with a same associated prediction mode and size as the currently decoded block. The most probable scanning order may also comprise one of a zig-zag scanning order, a horizontal scanning order, and a vertical scanning order.

Entropy decoding unit 70 may further receive encoded scanning order data for the block (906). Entropy decoding unit 70 may further decode the scanning order data to determine an indication of whether the scanning order associated with the block is the most probable scanning order (908). Entropy decoding unit 70 may decode the scanning order data to determine the indication by performing a context adaptive entropy coding process (e.g., a CABAC process) that includes applying a context model based on at least one context. For example, the at least one context may include one of the most probable scanning order, the prediction mode associated with the block, and the size associated with the block. The indication may comprise a single bin. For example, entropy decoding unit 70 may decode the scanning order data to determine the bin, such that the bin indicates whether the scanning order is the most probable scanning order (e.g., bin="0") or otherwise (e.g., bin="1").

In the event the scanning order associated with the block is the most probable scanning order (910), entropy decoding unit 70 may stop decoding the information that identifies the scanning order associated with the block (916), i.e., the scanning order information for the block. For example, entropy decoding unit 70 may proceed to other coding tasks, e.g., decoding of other syntax elements for the block, or a subsequent block, as described above.

In the event the scanning order associated with the block is not the most probable scanning order (910), however, entropy decoding unit 70 may further receive additional encoded scanning order data for the block (912). Entropy decoding unit 70 may further decode the additional scanning order data to determine an indication of the scanning order associated with the block (914). Once again, entropy decoding unit 70 may decode the additional scanning order data to determine the indication by performing a context adaptive entropy coding process (e.g., a CABAC process) that includes applying a context model based on at least one context. For example, the at least one context may include one of the most probable scanning order, the prediction mode associated with the block, and the size associated with the block. The indication of the scanning order associated with the block may also comprise a single bin. For example, entropy decoding unit 70 may decode the additional scanning order data to determine the bin, such that the bin indicates whether the scanning order is a first scanning order (e.g., bin="0") or a second scanning order (e.g., bin="1"). In this example, the first and second scanning orders may comprise scanning orders, other than the most probable scanning order, that are also used to code blocks of video data within the corresponding coding system 10 comprising video encoder 20 and video decoder 30. It should be noted that, in other examples, the scanning order associated with the block may comprise one of a greater number (e.g., 3, 4, 5, . . . etc.) of scanning orders, other than the most probable scanning order, that are also used to code blocks of video data within system 10. As such, in other examples, entropy decoding unit 70 may decode the additional scanning order data to determine the indication of the scanning order associated with the block using other techniques, e.g., using multiple bins.

To determine each bin (i.e., each bin used to represent the indication of whether the scanning order associated with the block is the most probable scanning order and the indication of the scanning order associated with the block) using the context adaptive entropy coding process described above, the corresponding context model may include probability estimates that indicate a probability of the bin comprising a given value (e.g., "0" or "1"). Entropy decoding unit 70 may use the probability estimates for the bin to determine the bin by performing the context adaptive entropy coding process. In some examples, entropy decoding unit 70 may determine the probability estimates using values of corresponding bins for previously decoded blocks of video data, e.g., blocks with a same associated prediction mode and size as the currently coded block. In other examples, entropy decoding unit 70 also may update the probability estimates using the value of the bin to reflect the probability of the bin comprising a given value. For example, entropy decoding unit 70 may use the updated probability estimates to decode scanning order information for subsequently decoded blocks of video data in the manner described above.

In any case, after decoding the additional scanning order data to determine the indication of the scanning order associated with the block (914), entropy decoding unit 70 may stop decoding the information that identifies the scanning order associated with the block (916), i.e., the scanning order information for the block. Once again, for example, entropy decoding unit 70 may proceed to other coding tasks, e.g., decoding of other syntax elements for the block, or a subsequent block, as described above.

In some examples, entropy decoding unit 70 may further receive remaining encoded significance data for the block (918). Entropy decoding unit 70 may further decode the remaining significance data to determine information that indicates positions of all other significant coefficients within the block (920), i.e., the significant coefficient position information for the block. For example, the significant coefficient position information for the block may be represented using a sequence of significant coefficient flags, as previously described. As also previously described, entropy decoding unit 70 may decode the remaining significance data to determine the significant coefficient position information by decoding the remaining significance data to generate each significant coefficient flag of the sequence. For example, entropy decoding unit 70 may perform a context adaptive entropy coding process (e.g., a CABAC process) that includes applying a context model based on a context, wherein the context may include a position of the flag within the block according to the scanning order associated with block.

In these examples, the context model may include probability estimates that indicate a probability of each flag comprising a given value (e.g., "0" or "1"). In some examples, entropy decoding unit 70 may determine the probability estimates using values of corresponding significant coefficient flags for previously decoded blocks of video data. In other examples, entropy decoding unit 70 also may update the probability estimates using the value of each flag to reflect the probability of the flag comprising a given value. For example, entropy decoding unit 70 may use the updated probability estimates to decode significant coefficient position information for subsequently decoded blocks of video data in the manner described above. It should be noted that, in other examples, entropy decoding unit 70 may decode the significant coefficient position information for the block using other techniques.

Finally, entropy decoding unit 70 may stop decoding the block (922). For example, entropy decoding unit 70 may proceed to other coding tasks, e.g., decoding subsequent blocks, as described above.

In this manner, the method of FIG. 9 represents an example of a method of decoding information that identifies a scanning order associated with a block of video data, including determining a most probable scanning order for the block, and decoding an indication of whether the scanning order associated with the block is the most probable scanning order.

Therefore, in accordance with the techniques of this disclosure, an encoded bitstream may comprise scanning order information for a block of video data, i.e., coefficients associated with the block. In particular, video encoder 20 may encode an indication of whether the scanning order associated with the block is the most probable scanning order. In some examples, in the event the scanning order associated with the block is not the most probable scanning order, video encoder 20 may further encode an indication of the scanning order associated with the block. Similarly, video decoder 30 may decode the indication of whether the scanning order associated with the block is the most probable scanning order. In some examples, in the event the scanning order associated with the block is not the most probable scanning order, video decoder 30 may further decode an indication of the scanning order associated with the block.

Accordingly, this disclosure also contemplates a computer-readable medium comprising a data structure stored thereon that includes an encoded bitstream. The encoded bitstream stored on the computer-readable medium may comprise video data encoded using a specific format, and encoded information that identifies a scanning order associated with a block of video data (i.e., scanning order information for the block), represented using one or more indications. The specific format in which the scanning order information for the block is encoded within the bitstream depends on whether the scanning order associated with the block is a most probable scanning order for the block. More specifically, the bitstream may include an indication of whether the scanning order associated with the block is the most probable scanning order. In some examples, in the event the scanning order does not comprise the most probable scanning order, the bitstream may further include an indication of the scanning order associated with the block.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding a first block of video data and coding a second block of video data during a video coding process, the method comprising:
   identifying, for the first block, a most probable predefined scanning order from a set of possible predefined scanning orders for the first block based on a prediction mode of the first block and a size of the first block, wherein the prediction mode is one of inter-prediction modes and intra-prediction modes, and the set of possible predefined scanning orders comprises a horizontal scanning order, a vertical scanning order, and a diagonal scanning order;
   determining that a scanning order to be used to code the first block is the most probable predefined scanning order for the first block;
   coding information indicating that the scanning order to be used to code the first block is the most probable predefined scanning order for the first block;
   based on the scanning order to be used to code the first block being the most probable predefined scanning order for the first block, coding the first block using the most probable predefined scanning order for the first block;
   coding information that indicates a position of a last significant coefficient in the first block of video data according to the most probable predefined scanning order for the first block;
   identifying, for the second block, a most probable predefined scanning order from a set of possible predefined scanning orders for the second block based on a prediction mode of the second block and a size of the second block, wherein the prediction mode is one of inter-prediction modes and intra-prediction modes, and the set of possible predefined scanning orders comprises a horizontal scanning order, a vertical scanning order, and a diagonal scanning order;

determining that a scanning order to be used to code the second block is not the most probable predefined scanning order for the second block;

coding information indicating that the scanning order to be used to code the second block is not the most probable predefined scanning order for the second block;

based on the scanning order to be used to code the second block not being the most probable predefined scanning order for the second block, coding the second block using a different scanning order from the set of possible predefined scanning orders for the second block that is different than the most probable predefined scanning order for the second block; and coding information that indicates a position of a last significant coefficient in the second block of video data according to the different scanning order used to code the second block.

2. The method of claim 1, wherein coding the information indicating that the scanning order to be used to code the first block is the most probable predefined scanning order for the first block comprises performing a context adaptive entropy coding process that includes applying a context model based on at least one context, wherein the at least one context includes one of the most probable predefined scanning order for the first block, the prediction mode of the first block, or the size of the first block.

3. The method of claim 1, wherein coding the second block using the different scanning order comprises coding an additional indication of the scanning order to be used to code the second block.

4. The method of claim 3, wherein coding the additional indication of the scanning order to be used to code the second block comprises performing a context adaptive entropy coding process that includes applying a context model based on at least one context, wherein the at least one context includes one of the most probable predefined scanning order for the second block, the prediction mode of the second block, or the size of the second block.

5. The method of claim 1, further comprising coding information that identifies positions of non-zero coefficients within the first block, and coding information that identifies positions of non-zero coefficients within the second block.

6. The method of claim 1, wherein coding comprises one of encoding or decoding.

7. An apparatus for coding a block of video data during a video coding process, the apparatus comprising:
a memory configured to store the block of video data; and
a video coder configured to:
identify, for the block, a most probable predefined scanning order from a set of possible predefined scanning orders for the block based on a prediction mode of the block and a size of the block, wherein the prediction mode is one of inter-prediction modes and intra-prediction modes, and the set of possible predefined scanning orders comprises a horizontal scanning order, a vertical scanning order, and a diagonal scanning order;
determine whether or not a scanning order to be used to code the block is the most probable predefined scanning order for the block;
code information indicative of whether the scanning order to be used to code the block is the most probable predefined scanning order for the block;
if the scanning order to be used to code the block is the most probable predefined scanning order for the block, code the block using the most probable predefined scanning order for the block;
if the scanning order to be used to code the block is not the most probable predefined scanning order for the block, code the block using a different scanning order from the set of possible predefined scanning orders for the block that is different than the most probable predefined scanning order for the block; and
code information that indicates a position of a last significant coefficient in the block of video data according to the scanning order used to code the block.

8. The apparatus of claim 7, wherein to code the information indicative of whether the scanning order to be used to code the block is the most probable predefined scanning order for the block, the video coder is configured to perform a context adaptive entropy coding process that includes the video coder applying a context model based on at least one context, wherein the at least one context includes one of the most probable predefined scanning order for the block, the prediction mode of the block, or the size of the block.

9. The apparatus of claim 7, wherein the video coder is further configured, if the scanning order to be used to code the block is not the most probable predefined scanning order for the block, to code an additional indication of the scanning order to be used to code the block.

10. The apparatus of claim 9, wherein to code the additional indication of the scanning order to be used to code the block, the video coder is configured to perform a context adaptive entropy coding process that includes the video coder applying a context model based on at least one context, wherein the at least one context includes one of the most probable predefined scanning order for the block, the prediction mode of the block, or the size of the block.

11. The apparatus of claim 7, wherein the video coder is further configured to code information that identifies positions of non-zero coefficients within the block.

12. The apparatus of claim 7, wherein the apparatus comprises at least one of:
an integrated circuit;
a microprocessor; or
a wireless communication device that includes the video coder.

13. The apparatus of claim 12, wherein the video coder comprises one of a video encoder or a video decoder.

14. A non-transitory, computer-readable medium comprising instructions that, when executed, cause a processor to code a block of video data during a video coding process, wherein the instructions cause the processor to:
identify, for the block, a most probable predefined scanning order from a set of possible predefined scanning orders for the block based on a prediction mode of the block and a size of the block, wherein the prediction mode is one of inter-prediction modes and intra-prediction modes, and the set of possible predefined scanning orders comprises a horizontal scanning order, a vertical scanning order, and a diagonal scanning order;
determine whether or not a scanning order to be used to code the block is the most probable predefined scanning order for the block;
code information indicative of whether the scanning order to be used to code the block is the most probable predefined scanning order for the block;
if the scanning order to be used to code the block is the most probable predefined scanning order for the block, code the block using the most probable predefined scanning order for the block;
if the scanning order to be used to code the block is not the most probable predefined scanning order for the block, code the block using a different scanning order from the set of possible predefined scanning orders for the block that is different than the most probable predefined scanning order for the block; and code information that indicates a position of a last significant coefficient in the block of video data according to the scanning order used to code the block.

15. The computer-readable medium of claim 14, wherein the instructions that cause the processor to code information indicative of whether the scanning order to be used to code the block is the most probable predefined scanning order for the block comprise instructions that cause the processor to perform a context adaptive entropy coding process that includes applying a context model based on at least one context, wherein the at least one context includes one of the most probable predefined scanning order for the block, the prediction mode of the block, or the size of the block.

16. The computer-readable medium of claim 14, wherein the instructions that cause the processor to code the block using the different scanning order, if the scanning order to be used to code the block is not the most probable predefined scanning order for the block, comprise instructions that cause the processor to code an additional indication of the different scanning order to be used to code the block.

17. The computer-readable medium of claim 16, wherein the instructions that cause the processor to code the additional indication of the scanning order to be used to code the block comprise instructions that cause the processor to perform a context adaptive entropy coding process that includes applying a context model based on at least one context, wherein the at least one context includes one of the most probable predefined scanning order for the block, the prediction mode of the block, or the size of the block.

18. The computer-readable medium of claim 14, wherein the instructions that cause the processor to code the block during the video coding process further cause the processor to code information that identifies positions of non-zero coefficients within the block.

19. The computer-readable medium of claim 14, wherein the instructions that cause the processor to code the block during the video coding process comprise instructions that cause the processor to encode the block or to decode the block.

* * * * *